(12) United States Patent
Xue et al.

(10) Patent No.: US 12,374,107 B2
(45) Date of Patent: Jul. 29, 2025

(54) OBJECT-AWARE TEMPERATURE ANOMALIES MONITORING AND EARLY WARNING BY COMBINING VISUAL AND THERMAL SENSING SENSING

(71) Applicant: Ambarella International LP, Santa Clara, CA (US)

(72) Inventors: Zhenwu Xue, Shanghai (CN); Yutao Feng, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 430 days.

(21) Appl. No.: 16/991,344

(22) Filed: Aug. 12, 2020

(65) Prior Publication Data
US 2022/0044023 A1    Feb. 10, 2022

(30) Foreign Application Priority Data
Aug. 5, 2020    (CN) .......................... 202010776855.9

(51) Int. Cl.
| | |
|---|---|
| *G06V 20/40* | (2022.01) |
| *G06F 1/20* | (2006.01) |
| *G06V 10/75* | (2022.01) |
| *G06V 20/20* | (2022.01) |
| *G06V 20/64* | (2022.01) |

(52) U.S. Cl.
CPC ............. *G06V 20/41* (2022.01); *G06F 1/206* (2013.01); *G06V 10/751* (2022.01); *G06V 20/20* (2022.01); *G06V 20/64* (2022.01)

(58) Field of Classification Search
None
See application file for complete search history.

(56) References Cited

U.S. PATENT DOCUMENTS

| | | | |
|---|---|---|---|
| 6,462,551 B1 | 10/2002 | Coates et al. | |
| 2005/0143133 A1* | 6/2005 | Bridgelall | H01Q 1/007 455/562.1 |
| 2008/0106437 A1* | 5/2008 | Zhang | G08B 17/00 340/584 |

(Continued)

FOREIGN PATENT DOCUMENTS

| | | |
|---|---|---|
| CN | 108995547 A | 12/2018 |
| CN | 109785571 A | 5/2019 |

(Continued)

*Primary Examiner* — Florian M Zeender
*Assistant Examiner* — Kimberly S. Bursum
(74) *Attorney, Agent, or Firm* — Maiorana Patent Law, PA

(57) ABSTRACT

An apparatus including an interface and a processor. The interface may be configured to receive pixel data generated by a capture device and a temperature measurement generated by a thermal sensor. The processor may be configured to receive the pixel data and the temperature measurement from the interface, generate video frames in response to the pixel data, perform computer vision operations on the video frames to detect objects, perform a classification of the objects detected based on characteristics of the objects, detect a temperature anomaly in response to the temperature measurement and the classification, and generate a control signal in response to the temperature anomaly. The control signal may provide a warning based on the temperature anomaly. The classification may provide a normal temperature range for the objects detected.

20 Claims, 10 Drawing Sheets

(56) References Cited

U.S. PATENT DOCUMENTS

| | | | |
|---|---|---|---|
| 2013/0307682 A1* | 11/2013 | Jerhotova | G06F 40/30 |
| | | | 340/521 |
| 2014/0152445 A1 | 6/2014 | Krieg et al. | |
| 2016/0195856 A1* | 7/2016 | Spero | G06N 5/046 |
| | | | 700/90 |
| 2017/0097944 A1* | 4/2017 | Bhanu | G06V 10/462 |
| 2018/0053055 A1* | 2/2018 | Finding | G06T 19/006 |
| 2019/0205655 A1* | 7/2019 | Matsuoka | G06V 10/143 |
| 2019/0244504 A1* | 8/2019 | Ebata | G08B 25/002 |
| 2020/0017050 A1* | 1/2020 | Kim | B60R 21/01534 |
| 2020/0147427 A1* | 5/2020 | Atkinson | G08B 7/06 |
| 2020/0211364 A1* | 7/2020 | Kasiviswanathan | |
| | | | G06K 9/00711 |
| 2020/0216026 A1* | 7/2020 | Price | G08B 13/19647 |
| 2021/0074139 A1* | 3/2021 | Sulucz | G08B 17/125 |
| 2021/0110691 A1* | 4/2021 | Heinonen | G08B 17/005 |
| 2021/0245627 A1* | 8/2021 | Ferguson | G05D 1/0291 |

FOREIGN PATENT DOCUMENTS

| | | |
|---|---|---|
| EP | 3613471 A1 | 2/2020 |
| WO | WO2020148625 A1 | 7/2020 |

\* cited by examiner

OBJECT-AWARE TEMPERATURE ANOMALIES MONITORING AND EARLY WARNING BY COMBINING VISUAL AND THERMAL SENSING SENSING

This application relates to Chinese Application No. 202010776855.9, filed Aug. 5, 2020, which is hereby incorporated by reference in its entirety.

FIELD OF THE INVENTION

The invention relates to computer vision generally and, more particularly, to a method and/or apparatus for implementing object-aware temperature anomalies monitoring and early warning by combining visual and thermal sensing.

BACKGROUND

Prevention of fires is an effective strategy for avoiding damage to people and property. Temperature anomalies are important early indicators of various disasters such as fires. Effectively detecting temperature anomalies can predict fires. Thermal sensing can be used to detect global anomalies in simple scenarios like forest fires. However, thermal sensing is a blunt tool for predicting fires. Thermal sensing tends to miss true alarms or triggers false alarms in complex scenarios such as parking lots, buildings and streets.

Context is an important consideration when detecting temperature anomalies. For example, a surface that is exposed to sunlight for long periods of time will become very hot, but might not pose a fire risk. Batteries of electric vehicles pose a thermal runaway risk that can result in a fire. Detecting a temperature anomaly in a battery could predict a potential fire. However, thermal sensors are not object-aware. A thermal sensor cannot distinguish between a hot surface (i.e., from sunlight) and a battery that is rapidly heating due to thermal runaway. Without context, the thermal sensor will miss scenarios that actually pose a risk of fire or falsely provide a warning when there is no fire risk.

It would be desirable to implement object-aware temperature anomalies monitoring and early warning by combining visual and thermal sensing.

SUMMARY

The invention concerns an apparatus comprising an interface and a processor. The interface may be configured to receive pixel data generated by a capture device and a temperature measurement generated by a thermal sensor. The processor may be configured to receive the pixel data and the temperature measurement from the interface, generate video frames in response to the pixel data, perform computer vision operations on the video frames to detect objects, perform a classification of the objects detected based on characteristics of the objects, detect a temperature anomaly in response to the temperature measurement and the classification, and generate a control signal in response to the temperature anomaly. The control signal may provide a warning based on the temperature anomaly. The classification may provide a normal temperature range for the objects detected.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
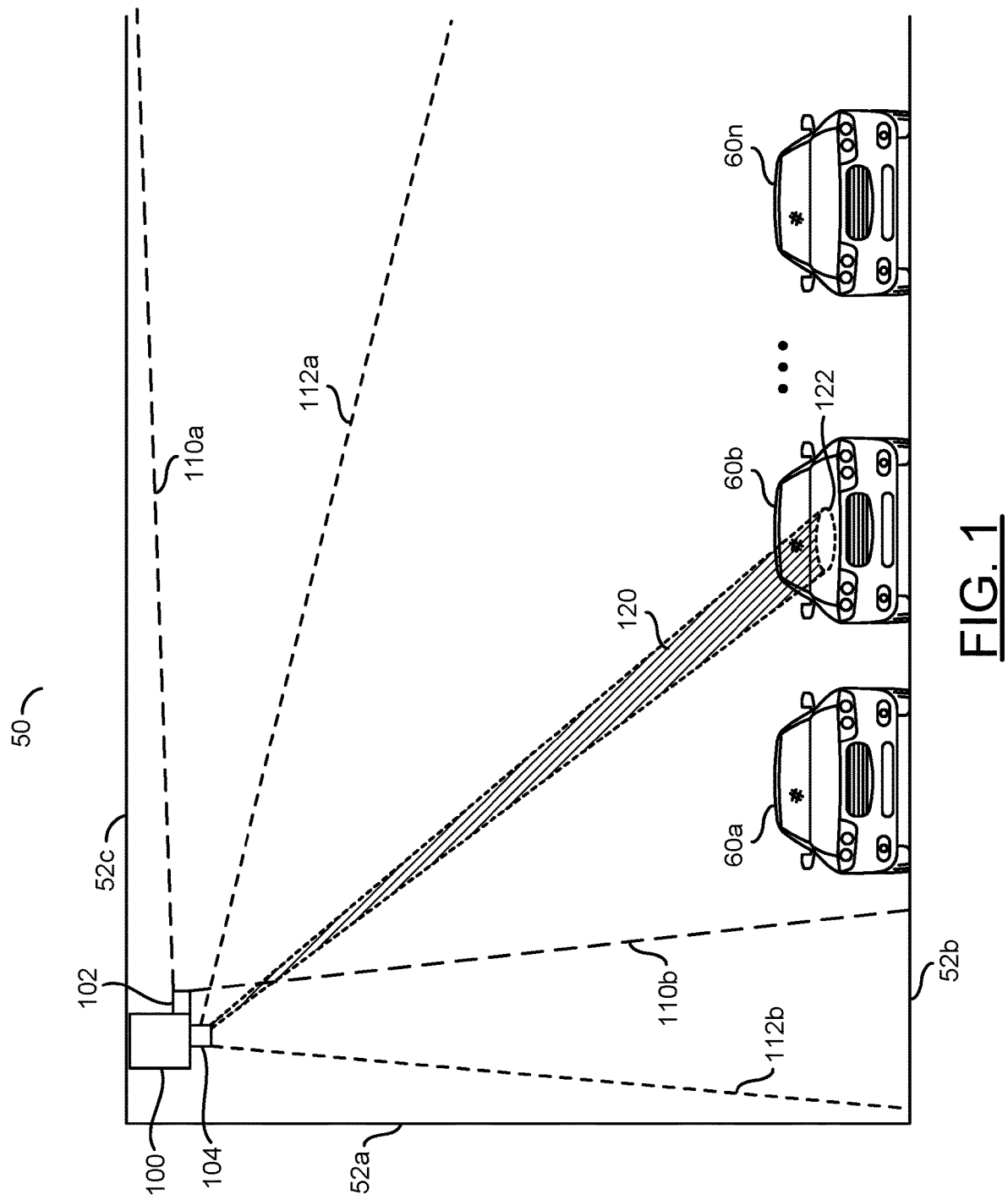
FIG. 1 is a diagram illustrating an example context of an embodiment of the present invention.

Embodiments of the present invention include providing object-aware temperature anomalies monitoring and early warning by combining visual and thermal sensing that may (i) make a decision using sensor fusion, (ii) make inferences based on multiple sources of data, (iii) detect thermal runaway in a battery, (iv) monitor electric vehicles to predict a potential fire, (v) detect and classify objects, (vi) monitor specific features of objects based on a classification, (vii) prevent false alarms, (viii) implement computer vision efficiently using dedicated hardware modules and/or (ix) be implemented as one or more integrated circuits.

Embodiments of the present invention may implement an object-aware temperature anomaly monitoring system. The object-aware temperature anomaly warning system may be configured to provide an early warning for various hazards. For example, the early warning may be provided when a potential fire risk is detected.

Embodiments of the present invention may implement object-aware temperature anomaly monitoring by combining visual sensing and thermal sensing. Regions of temperature anomalies may be detected and/or localized in both thermal images and visual images. In an example, the visual images may comprise video frames (e.g., one or more RGB images). Computer vision may be applied to the combination of data generated by a visible light imaging sensor and a thermal imaging sensor. Computer vision operations may be applied to the thermal image or the visual image. The computer vision operations may be applied to both the thermal image and the visual image (e.g., sensor fusion).

The object-awareness may be provided by implementing artificial intelligence and/or computer vision technologies. Computer vision operations may be performed on video frames. The computer vision may be configured to detect objects and/or classify/identify the detected objects according to a category. Each category of object may comprise data about features and/or normal temperature ranges for the particular type of object.

The thermal sensor may be configured to measure temperatures of an area to detect regions that may be considered a temperature anomaly. In one example, a temperature anomaly may be a temperature that is outside (e.g., greater than) a normal operating temperature range. In another example, the temperature anomaly may be a temperature that quickly increases within a particular period of time (e.g., a rapid change in temperature). The temperature measurement alone may not be sufficient information to use as the basis for providing a warning. Data extracted from the video frames using the computer vision may be combined with the temperature measurements performed by the thermal sensor. Objects may be detected and classified in the regions identified as having temperature anomalies. A decision may be made about whether to trigger an early warning according to the normal temperature range of that object category. For example, if the temperature anomaly is outside (e.g., above) the normal temperature range for the class of object detected, then an early warning may be generated. Data combined from the RGB image and the thermal image may be used to determine where the temperature anomaly is happening (e.g., identify a feature of the detected object that corresponds to the temperature anomaly).

Embodiments of the present invention may be configured to perform early detection and/or provide relevant warnings for electrical vehicle (EV) fires. In an example, the computer vision operations may be configured to classify/identify an EV based on license plate recognition and/or car model recognition using the RBG image first (e.g., performing computer vision on video frames), while the thermal camera may detect regions of temperature anomalies. A sudden and/or rapid temperature increase may be one example of a temperature anomaly. The object-awareness may enable the location and/or feature of the EV that is causing the temperature anomaly to be identified. In an example, if the bottom of an EV corresponds to the location of the detected temperature anomaly, the classification of the EV may provide information that the battery is located on the bottom of the EV. The classification and/or the location of the temperature anomaly may be used to determine that the battery may be the feature of the EV that is the source of the temperature anomaly. An early warning of a battery fire may be generated. The decision to generate the early warning may be based on the joint sources of data (e.g., based on object detection and recognition using RGB image, and rapid temperature change using thermal image).

Referring to FIG. 1, a diagram illustrating an example context of an embodiment of the present invention is shown. An example scenario 50 is shown as context. The example scenario 50 may comprise surfaces 52a-52c. In one example, the surface 52a may be a wall. The surface 52b may be the ground. The surface 52c may be a ceiling. In an example, the surfaces 52a-52c may be a parking garage. Vehicles 60a-60n are shown on the ground 52b. In an example, the vehicles 60a-60n may be parked and left unattended (e.g., not monitored by a person). In another example, the surface 52a may be a charging station (e.g., for charging an electric vehicle).

A block (or circuit) 100 is shown. The circuit may implement a camera system. In the example scenario 50, the camera system 100 may be mounted to the ceiling 52c. In some embodiments, the camera system 100 may be implemented in an outdoor environment (e.g., with no ceiling 52c). The camera system 100 may alternatively be mounted to the wall 52b and/or another vertical structure (e.g., a lamp post, a billboard, a sign, etc.). In the example shown, the camera system 100 is shown mounted from a relatively high location. In some embodiments, the camera system 100 may be mounted at a lower position. In an example, the surface 52b may be a charging station and the camera system 100 may be mounted to the charging station 52b to enable the camera system 100 to monitor electric vehicles connected to a charging station. The mounting location of the camera system 100 may be varied according to the design criteria of a particular implementation.

A block (or circuit) 102 and/or a block (or circuit) 104 is shown. The circuit 102 may implement a capture device. The circuit 104 may implement a thermal sensor. In the example shown, the capture device 102 and the thermal sensor 104 may be external to the camera system 100. In some embodiments, one or both of the capture device 102 and the thermal sensor 104 may be internal components of the camera system 100. For example, the capture device 102 may be implemented internal to the camera system 100 (e.g., a lens may be implemented on the camera system 100 to enable light to be captured by the capture device 102). In the example shown, the one capture device 102 and one thermal sensor 104 may be connected to the camera system 100. In some embodiments, multiple capture devices 102a-102n (not shown) and/or multiple thermal sensors 104a-104n (not shown) may be connected to the camera system 100. The arrangement of the camera system 100, the capture device 102 and/or the thermal sensor 104 may be varied according to the design criteria of a particular implementation. Details of the components and/or signals generated by the camera system 100, the capture device 102 and/or the thermal sensor 104 may be explained in more detail in association with FIG. 2.

Dotted lines 110a-110b are shown extending from the capture device 102. The dotted lines 110a-110b may represent a region of interest (e.g., field of view) of the capture device 102. In an example, the capture device 102 may implement a RGB camera and the capture device 102 may generate pixel data of an area within the range of the region of interest 110a-110b. The camera system 100 may be configured to generate video frames in response to the pixel data generated by the capture device 102. In some embodiments, the region of interest 110a-110b may comprise a wide-angle field of view. The camera system 100 may be configured to perform de-warping operations to correct distortions caused by the wide angle lenses used to capture the wide-angle field of view 110a-110b. The vehicles 60a-60n are shown within the region of interest 110a-110b. In an example, the capture device 102 may be configured to provide video monitoring of the vehicles 60a-60n (e.g., a parking garage camera).

Dotted lines 112a-112b are shown extending from the thermal sensor 104. The dotted lines 112a-112b may represent a monitoring range (e.g., thermal region of interest) of the thermal sensor 104. The thermal sensor 104 may be configured to perform temperature measurements within the monitoring range 112a-112b. The vehicles 60a-60n are shown within the monitoring range 112a-112b of the thermal sensor 104.

The thermal sensor 104 may be configured to measure temperatures at a distance. For example, the thermal sensor 104 may not need to be close up to the vehicles 60a-60n to perform temperature measurements of the vehicles 60a-60n. A shaded region 120 is shown. The shaded region 120 may represent the temperature measurement at a distance. In the example shown, the shaded region may perform a distance temperature measurement of the vehicle 60b.

An area 122 is shown at the end of the distance temperature measurement 120. The area 122 may represent a surface temperature measurement. In the example shown, the thermal sensor 104 may perform a temperature measurement of the surface (e.g., the hood) of the vehicle 60b. While one area 122 is shown in the example scenario 50, the thermal sensor 104 may be configured to measure the surface temperature within the entire monitoring range 112a-112b. For example, the thermal sensor 104 may be configured to generate thermal images comprising temperature measurements of all surfaces within the monitoring range 112a-112b (e.g., a heat map).

In the example shown, the region of interest 110a-110b is shown covering an area different from the monitoring region 112a-112b of the thermal sensor 104. The differences between the location of the region of interest 110a-110b and the monitoring region 112a-112b may be shown for illustrative purposes. In some embodiments, the region of interest 110a-110b may cover the same area as the monitoring region 112a-112b. For example, by covering the same areas, the thermal sensor 104 may provide temperature measurements that correspond to locations in the video frames generated in response to pixel data generated by the capture device 102.

In some embodiments, the capture device 102 and the thermal sensor 104 may provide mounting location and/or view angle information to the camera system 100. The mounting location and/or the view angle information may enable the camera system 100 to determine a disparity between the region of interest 110a-110b and the monitoring region 112a-112b. Determining the disparity between the region of interest 110a-110b and the monitoring region 112a-112b may enable the camera system 100 to correlate the temperature measurements performed by the thermal sensor 104 at a particular time, to a location in the video frames generated from pixel data captured by the capture device 102 at a particular time.

Figure 2:
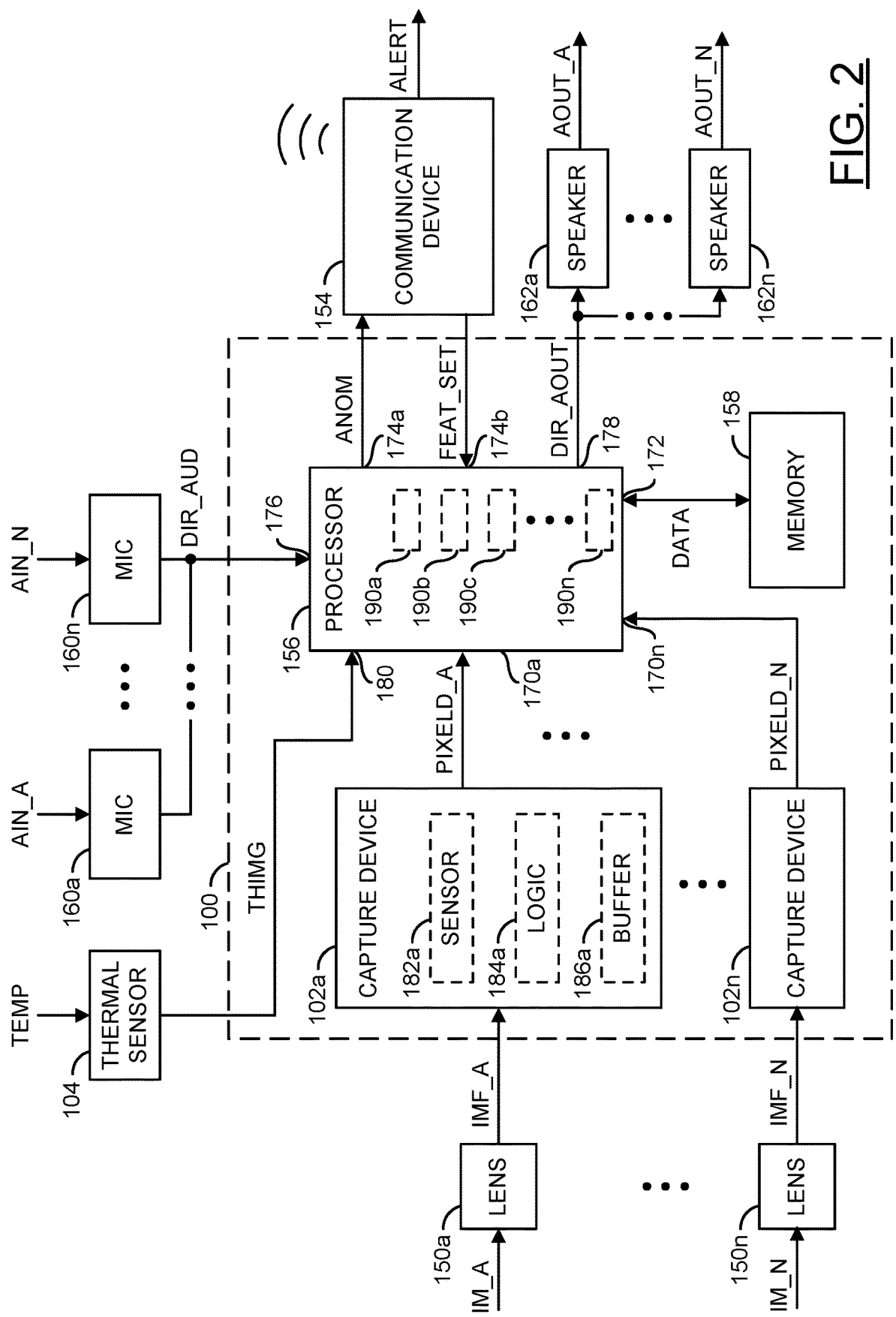
FIG. 2 is a block diagram illustrating an example embodiment of the present invention.

Referring to FIG. 2, a block diagram illustrating an example embodiment of the invention is shown. The apparatus 100 is shown. The apparatus 100 generally comprises the capture devices 102a-102n, the thermal sensor 104, blocks (or circuits) 150a-150n, a block (or circuit) 154, a block (or circuit) 156, a block (or circuit) 158, blocks (or circuits) 160a-160n and/or blocks (or circuits) 162a-162n. The capture devices 102a-102n may be one or more implementations of the capture device 102 shown in association with FIG. 1. The blocks 150a-150n may implement lenses. The circuit 154 may implement a communication device. The circuit 156 may implement a processor. The circuit 158 may implement a memory. The circuits 160a-160n may implement microphones (e.g., audio capture devices). The circuits 162a-162n may implement audio output devices (e.g., speakers). The apparatus 100 may comprise other components (not shown). In the example shown, some of the thermal sensor 104, the lenses 150a-150n, the communication device 154 and the speakers 162a-162n are shown external to the camera system 100. However, the various components of the camera system 100 may be implemented within and/or attached to the camera system 100 (e.g., the speakers 162a-162n may provide better functionality if not located inside a housing of the camera system 100). The number, type and/or arrangement of the components of the apparatus 100 may be varied according to the design criteria of a particular implementation.

In an example implementation, the circuit 156 may be implemented as a video processor. The processor 156 may comprise inputs 170a-170n and/or other inputs. The processor 156 may comprise an input/output 172. The processor 156 may comprise an output 174a and an input 174b. The processor 156 may comprise an input 176. The processor 156 may comprise an output 178 and/or other outputs. The processor 156 may comprise an input 180. The number of inputs, outputs and/or bi-directional ports implemented by the processor 156 may be varied according to the design criteria of a particular implementation.

In the embodiment shown, the capture devices 102a-102n may be components of the apparatus 100. In some embodiments, the capture devices 102a-102n may be separate devices (e.g., remotely connected to the camera system 100, such as a drone, a robot and/or a system of security cameras configured capture video data) configured to send data to the apparatus 100. In one example, the capture devices 102a-102n may be implemented as part of an autonomous robot configured to patrol particular paths such as hallways and/or parking garages. Similarly, in the example shown, the wireless communication device 154, the microphones 160a-160n and/or the speakers 162a-162n are shown external to the apparatus 100 but in some embodiments may be a component of (e.g., within) the apparatus 100.

The apparatus 100 may receive one or more signals (e.g., IMF_A-IMF_N), a signal (e.g., FEAT_SET), a signal (e.g., THIMG) and/or one or more signals (e.g., DIR_AUD). The apparatus 100 may present a signal (e.g., ANOM), a signal and/or a signal (e.g., DIR_AOUT). The capture devices 102a-102n may receive the signals IMF_A-IMF_N from the corresponding lenses 150a-150n. The processor 156 may receive the signal DIR_AUD from the microphones 160a-160n. The processor 156 may present the signal ANOM to the communication device 154 and receive the signal FEAT_SET from the communication device 154. For example, the wireless communication device 154 may be a radio-frequency (RF) transmitter. In another example, the communication device 154 may be a Wi-Fi module. In another example, the communication device 154 may be a device capable of implementing RF transmission, Wi-Fi, Bluetooth and/or other wireless communication protocols. The processor 156 may present the signal DIR_AOUT to the speakers 162a-162n.

The lenses 150a-150n may capture signals (e.g., IM_A-IM_N). The signals IM_A-IM_N may be an image (e.g., an analog image) of the environment near the camera system 100 presented by the lenses 150a-150n to the capture devices 102a-102n as the signals IMF_A-IMF_N. The environment near the camera system 100 may be the field of view 110a-110n. The lenses 150a-150n may be implemented as an optical lens. The lenses 150a-150n may provide a zooming feature and/or a focusing feature. The capture devices 102a-102n and/or the lenses 150a-150n may be implemented, in one example, as a single lens assembly. In another example, the lenses 150a-150n may be a separate implementation from the capture devices 102a-102n. The capture devices 102a-102n are shown within the circuit 100. In an example implementation, the capture devices 102a-102n may be implemented outside of the circuit 100 (e.g., along with the lenses 150a-150n as part of a lens/capture device assembly).

The capture devices 102a-102n may be configured to capture image data for video (e.g., the signals IMF_A-IMF_N from the lenses 150a-150n). In some embodiments, the capture devices 102a-102n may be video capturing devices such as cameras. The capture devices 102a-102n may capture data received through the lenses 150a-150n to generate raw pixel data. In some embodiments, the capture devices 102a-102n may capture data received through the lenses 150a-150n to generate bitstreams (e.g., generate video frames). For example, the capture devices 102a-102n may receive focused light from the lenses 150a-150n. The lenses 150a-150n may be directed, tilted, panned, zoomed and/or rotated to provide a targeted view from the camera system 100 (e.g., to provide coverage for a panoramic field of view such as the field of view 110a-110b). The capture devices 102a-102n may generate signals (e.g., PIXELD_A-PIXELD_N). The signals PIXELD_A-PIXELD_N may be pixel data (e.g., a sequence of pixels that may be used to generate video frames). In some embodiments, the signals PIXELD_A-PIXELD_N may be video data (e.g., a sequence of video frames). The signals PIXELD_A-PIXELD_N may be presented to the inputs 170a-170n of the processor 156.

The capture devices 102a-102n may transform the received focused light signals IMF_A-IMF_N into digital data (e.g., bitstreams). In some embodiments, the capture devices 102a-102n may perform an analog to digital conversion. For example, the capture devices 102a-102n may perform a photoelectric conversion of the focused light received by the lenses 150a-150n. The capture devices 102a-102n may transform the bitstreams into pixel data, images and/or video frames. In some embodiments, the pixel data generated by the capture devices 102a-102n may be uncompressed and/or raw data generated in response to the focused light from the lenses 150a-150n. In some embodiments, the output of the capture devices 102a-102n may be digital video signals.

The thermal sensor 104 may be configured to generate temperature measurements. The temperature measurements may comprise a thermal image. The thermal sensor 104 may generate a thermal image of the temperature monitoring region 112a-112b. The thermal image generated may be a low resolution of data (e.g., temperature measurement data).

The thermal sensor 104 may receive a signal (e.g., TEMP). The signal TEMP may be the temperature detected by the thermal sensor within the temperature monitoring region 112a-112b. The thermal sensor 104 may generate the signal THIMG. The signal THIMG may be generated in response to the signal TEMP detected. In one example, the signal THIMG may be the thermal image. In another example, the signal THIMG may be a data set of temperatures of the thermal monitoring region 112a-112b captured at a particular time and the processor 156 may generate the thermal image from the data set of temperature measurements. The signal THIMG may be presented to the input 180 of the processor 156.

The communication device 154 may send and/or receive data to/from the apparatus 100. In some embodiments, the communication device 154 may be implemented as a wireless communications module. In some embodiments, the communication device 154 may be implemented as a satellite connection to a proprietary system. In one example, the communication device 154 may be a hard-wired data port (e.g., a USB port, a mini-USB port, a USB-C connector, HDMI port, an Ethernet port, a DisplayPort interface, a Lightning port, etc.). In another example, the communication device 154 may be a wireless data interface (e.g., Wi-Fi, Bluetooth, ZigBee, cellular, etc.).

The communication device 154 may be configured to receive the signal FEAT_SET. The signal FEAT_SET may comprise a feature set that corresponds to the classification of various objects (e.g., people, animals, vehicles, street signs, etc.). The feature set information may comprise instructions for the processor 156 to classify various objects and/or localize objects within a video frame.

The processor 156 may receive the signals PIXELD_A-PIXELD_N from the capture devices 102a-102n at the inputs 170a-170n. The processor 156 may send/receive a signal (e.g., DATA) to/from the memory 158 at the input/output 172. The processor 156 may send the signal ANOM to the communication device 154 via the output port 174a.

The processor 156 may receive the signal FEAT_SET from the communication device 154 via the input port 174b. The processor 156 may receive the signal DIR_AUD from the microphones 160a-160n at the port 176. The processor 156 may send the signal DIR_AOUT to the speakers 162a-162n via the port 178. The processor 156 may receive the signal THIMG at the interface port 180. In an example, the processor 156 may be connected through a bi-directional interface (or connection) to the capture devices 102a-102n, the thermal sensor 104, the communication device 154, the memory 158, the microphones 160a-160n and/or the speakers 162a-162n. The processor 156 may store and/or retrieve data from the memory 158. The memory 158 may be configured to store computer readable/executable instructions (or firmware). The instructions, when executed by the processor 156, may perform a number of steps.

The signal PIXELD_A-PIXELD_N may comprise raw pixel data providing a field of view captured by the lenses 150a-150n. The processor 156 may be configured to generate video frames from the pixel data PIXELD_A-PIXELD_N. The video frames generated by the processor 156 may be used internal to the processor 156. In some embodiments, the video frames may be communicated to the memory 158 for temporary storage.

The processor 156 may be configured to make decisions based on analysis of the video frames generated from the signals PIXELD_A-PIXELD_N. The processor 156 may generate the signal ANOM, the signal DATA, the signal DIR_AOUT and/or other signals (not shown). The signal ANOM, the signal DATA and/or the signal DIR_AOUT may each be generated (in part) based on one or more decisions made and/or functions performed by the processor 156. The decisions made and/or functions performed by the processor 156 may be determined based on data received by the processor 156 at the inputs 170a-170n (e.g., the signals PIXELD_A-PIXELD_N), the input 172, the input 174b, the input 176, the input 180 and/or other inputs.

The inputs 170a-170n, the input/output 172, the output 174a, the input 174b, the input 176, the output 178, the input 180 and/or other inputs/outputs may implement an interface. The interface may be implemented to transfer data to/from the processor 156, the capture devices 102a-102n, the thermal sensor 104, the communication device 154, the memory 158, the microphones 160a-160n, the speakers 162a-162n and/or other components of the apparatus 100. In one example, the interface may be configured to receive (e.g., via the inputs 170a-170n) the pixel data signals PIXELD_A-PIXELD_N each from a respective one of the capture devices 102a-102n. In another example, the interface may be configured to receive (e.g., via the input 176) the directional audio DIR_AUD. In yet another example, the interface may be configured to transmit information about a temperature anomaly (e.g., the signal ANOM) and/or the converted data determined based on the computer vision operations to the communication device 154. In still another example, the interface may be configured to receive the feature set information FEAT_SET (e.g., via the input port 174b) from the communication device 154. In another example, the interface may be configured to transmit directional audio output (e.g., the signal DIR_AOUT) to each of the speakers 162a-162n. In yet another example, the interface may be configured to to receive (e.g., via the input 180) the thermal image data THIMG from the thermal sensor 104. The interface may be configured to enable transfer of data and/or translate data from one format to another format to ensure that the data transferred is readable by the intended destination component. In an example, the interface may comprise a data bus, traces, connectors, wires and/or pins. The implementation of the interface may be varied according to the design criteria of a particular implementation.

The signal ANOM may be presented to the communication device 154. In some embodiments, the signal ANOM may comprise parameters and/or statistics determined by the processor 156 about the video frames. The signal ANOM may be generated in response to the computer vision operations and/or sensor fusion operations performed. The signal ANOM may comprise information about a detected temperature anomaly. In some embodiments, the signal ANOM may comprise video frames that correspond to the detected temperature anomaly. The video frames may be encoded, cropped, stitched and/or enhanced versions of the pixel data received from the signals PIXELD_A-PIXELD_N. In an example, the video frames may be a high resolution, digital, encoded, de-warped, stabilized, cropped, blended, stitched and/or rolling shutter effect corrected version of the signals PIXELD_A-PIXELD_N. The signal ANOM may comprise data about the temperature anomaly such as temperatures detected, the classification of the object associated with the temperature anomaly, the rate of temperature change detected, the type of potential hazard detected (e.g., potential fire detected), the location of the temperature anomaly, etc.

The communication device 154 may be configured to generate a signal (e.g., ALERT). The signal ALERT may be an early warning corresponding to the temperature anomaly detected. For example, the communication device 154 may generate the signal ALERT in response to the signal ANOM. The signal ALERT may be a packetized version of the signal ANOM that may be communicated according to a particular communications protocol (e.g., Wi-Fi, SMS, Bluetooth, etc.).

In some embodiments, the signal ALERT may be a text message (e.g., a string of human readable characters). In some embodiments, the signal ANOM may be a symbol that indicates an event or status (e.g., a fire symbol, a high heat symbol, a battery explosion symbol, etc.). The signal ANOM and/or the signal ALERT may be generated based on video analytics (e.g., computer vision operations) performed by the processor 156 on the video frames generated from the pixel data PIXELD_A-PIXELD_N and/or the data from the thermal image THIMG. The processor 156 may be configured to perform the computer vision operations to detect objects and/or events in the video frames and then convert the detected objects and/or events into statistics and/or parameters.

The computer vision operations performed by the processor 156 may comprise object detection (e.g., bounding boxes that locate positions of objects), classification (inferring that the detected object is a particular type of object), segmentation (e.g., dividing the image into various regions based on characteristics of pixels to identify objects/boundaries), etc. The data determined by the computer vision operations may be converted to the human-readable format by the processor 156. The data from the computer vision operations that has been converted to the human-readable format may be communicated as the signal ALERT. The signal ALERT may be communicated to a particular person, a monitoring service and/or an emergency response service (e.g., fire department).

The apparatus 100 may implement a camera system. In some embodiments, the camera system 100 may be implemented as a drop-in solution (e.g., installed as one component). In an example, the camera system 100 may be a device that may be installed as an after-market product (e.g., a retro-fit for a drone, a retro-fit for a security system, etc.). In some embodiments, the apparatus 100 may be a component of a security system. The number and/or types of signals and/or components implemented by the camera system 100 may be varied according to the design criteria of a particular implementation.

The video data of the targeted view captured in the field of view 110a-110b may be generated from the signals/bitstreams/data PIXELD_A-PIXELD_N. The capture devices 102a-102n may present the signals PIXELD_A-PIXELD_N to the inputs 170a-170n of the processor 156. The signals PIXELD_A-PIXELD_N may be used by the processor 156 to generate the video frames/video data. In some embodiments, the signals PIXELD_A-PIXELD_N may be video streams captured by the capture devices 102a-102n. In some embodiments, the capture devices 102a-102n may be implemented in the camera system 100. In some embodiments, the capture devices 102a-102n may be configured to add to existing functionality to the camera system 100.

Each of the capture devices 102a-102n may comprise a block (or circuit) 182, a block (or circuit) 184, and/or a block (or circuit) 186. The circuit 182 may implement a camera sensor (e.g., a complementary metal-oxide-semiconductor (CMOS) sensor). The circuit 184 may implement a camera processor/logic. The circuit 186 may implement a memory buffer. As a representative example, the capture device 102a is shown comprising the sensor 182a, the logic block 184a and the buffer 186a. Similarly, the capture devices 102b-102n may comprise the camera sensors 182b-182n, the logic blocks 184b-184n and the buffers 186b-186n. The sensors 182a-182n may each be configured to receive light from the corresponding one of the lenses 150a-150n and transform the light into digital data (e.g., the bitstreams).

In one example, the sensor 182a of the capture device 102a may receive light from the lens 150a. The camera sensor 182a of the capture device 102a may perform a photoelectric conversion of the light from the lens 150a. In some embodiments, the sensor 182a may be an oversampled binary image sensor. The logic 184a may transform the bitstream into a human-legible content (e.g., pixel data and/or video data). For example, the logic 184a may receive pure (e.g., raw) data from the camera sensor 182a and generate pixel data based on the raw data (e.g., the bitstream). The memory buffer 186a may store the raw data and/or the processed bitstream. For example, the frame memory and/or buffer 186a may store (e.g., provide temporary storage and/or cache) the pixel data and/or one or more of the video frames (e.g., the video signal).

The microphones 160a-160n may be configured to capture incoming audio and/or provide directional information about the incoming audio. Each of the microphones 160a-160n may receive a respective signal (e.g., AIN_A-AIN_N). The signals AIN_A-AIN_N may be audio signals from the environment near the apparatus 100. For example, the signals AIN_A-AIN_N may be ambient noise in the environment. The microphones 160a-160n may be configured to generate the signal DIR_AUD in response to the signals AIN_A-AIN_N. The signal DIR_AUD may be a signal that comprises the audio data from the signals AIN_A-AIN_N. The signal DIR_AUD may be a signal generated in a format that provides directional information about the signals AIN_A-AIN_N.

The microphones 160a-160n may provide the signal DIR_AUD to the interface 176. The apparatus 100 may comprise the interface 176 configured to receive data (e.g., the signal DIR_AUD) from one or more of the microphones 160a-160n. In one example, data from the signal DIR_AUD presented to the interface 176 may be used by the processor 156 to be used for sensor fusion analysis (e.g., a hissing sound may indicate a potential combustion).

The number of microphones 160a-160n may be varied according to the design criteria of a particular implementation. The number of microphones 160a-160n may be selected to provide sufficient directional information about the incoming audio (e.g., the number of microphones 160a-160n implemented may be varied based on the accuracy and/or resolution of directional information acquired). In an example, 2 to 6 of the microphones 160a-160n may be implemented. In some embodiments, an audio processing component may be implemented with the microphones 160a-160n to process and/or encode the incoming audio signals AIN_A-AIN_N. In some embodiments, the processor 156 may be configured with on-chip audio processing to encode the incoming audio signals AIN_A-AIN_N. The microphones 160a-160n may capture audio of the environment. The apparatus 100 may be configured to synchronize the audio captured with the images captured by the capture devices 102a-102n.

The processor 156 may be configured to execute computer readable code and/or process information. The processor 156 may be configured to receive input and/or present output to the memory 158. The processor 156 may be configured to present and/or receive other signals (not shown). The number and/or types of inputs and/or outputs of the processor 156 may be varied according to the design criteria of a particular implementation.

The processor 156 may receive the signals PIXELD_A-PIXELD_N, the signal DIR_AUDIO, the signal FEAT_SET, the signal THIMG and/or the signal DATA. The processor 156 may make a decision based on data received at the inputs 170a-170n, the input 172, the input 174b, the input 176, the input 180 and/or other input. For example, other inputs may comprise external signals generated in response to user input, external signals generated by the microphones 160a-160n and/or internally generated signals such as signals generated by the processor 156 in response to analysis of the video frames and/or objects detected in the video frames. The processor 156 may adjust the video data (e.g., crop, digitally move, physically move the camera sensors 182a-182n, etc.) of the video frames. The processor 156 may generate the signal ANOM and/or the signal DIR_AOUT in response to data received by the inputs 170a-170n, the input 172, the input 174b, the input 176, the input 180 and/or the decisions made in response to the data received by the inputs 170a-170n, the input 172, the input 174b, the input 176 and/or the input 180.

The signal ANOM and/or the signal DIR_AOUT may be generated to provide an output in response to the captured video frames and the video analytics and/or the sensor fusion performed by the processor 156. For example, the video analytics may be performed by the processor 156 in real-time and/or near real-time (e.g., with minimal delay).

The cropping, downscaling, blending, stabilization, packetization, encoding, compression and/or conversion performed by the processor 156 may be varied according to the design criteria of a particular implementation. For example, the video frames generated by the processor 156 may be a processed version of the signals PIXELD_A-PIXELD_N configured to enable detection of objects, classification of objects and/or determination of characteristics of the detected objects. In some embodiments, the video data may be encoded at a high bitrate. For example, the signal may be generated using a lossless compression and/or with a low amount of lossiness.

In some embodiments, the video frames may be some view (or derivative of some view) captured by the capture devices 102a-102n. For example, the video frames may comprise a portion of the panoramic video captured by the capture devices 102a-102n. In another example, the video frames may comprise a region of interest selected and/or cropped from the panoramic video frame by the processor 156 (e.g., upscaled, oversampled and/or digitally zoomed) to enable a high precision of object detection. In some embodiments, the video frames may provide a series of cropped and/or enhanced panoramic video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 156 to see the location 50 better than a person would be capable of with human vision.

The memory 158 may store data. The memory 158 may be implemented as a cache, flash memory, DRAM memory, etc. The type and/or size of the memory 158 may be varied according to the design criteria of a particular implementation. The data stored in the memory 158 may correspond to a video file, user profiles, user permissions, object classifications, normal operating temperatures and/or locations of various features of particular vehicles, etc.

The lenses 150a-150n (e.g., camera lenses) may be directed to provide a panoramic view from the camera system 100. The lenses 150a-150n may be aimed to capture environmental data (e.g., light). The lens 150a-150n may be configured to capture and/or focus the light for the capture devices 102a-102n. Generally, the camera sensors 182a-182n may be located behind each of the respective lenses 150a-150n. Based on the captured light from the lenses 150a-150n, the capture devices 102a-102n may generate a bitstream and/or raw pixel data.

Embodiments of the processor 156 may perform video stitching operations on the signals PIXELD_A-PIXELD_N. In one example, each of the pixel data signals PIXELD_A-PIXELD_N may provide a portion of a panoramic view and the processor 156 may crop, blend, synchronize and/or align the pixel data from the signals PIXELD_A-PIXELD_N to generate the panoramic video frames. In some embodiments, the processor 156 may be configured to perform electronic image stabilization (EIS). The processor 156 may perform de-warping on the video frames. The processor 156 may perform intelligent video analytics on the de-warped video frames. The processor 156 discard the video frames after the video analytics and/or computer vision has been performed.

The processor 156 may receive an input to generate the video frames (e.g., the signals PIXELD_A-PIXELD_N) from the CMOS sensor(s) 182a-182n. The pixel data signals PIXELD_A-PIXELD_N may be enhanced by the processor 156 (e.g., color conversion, noise filtering, auto exposure, auto white balance, auto focus, etc.). Generally, the panoramic video may comprise a large field of view generated by one or more lenses/camera sensors. One example of a panoramic video may be an equirectangular 360 video. Equirectangular 360 video may also be called spherical panoramas. Panoramic video may be a video that provides a field of view that is larger than the field of view that may be displayed on a device used to playback the video. For example, the field of view 110a-110b captured by the camera system 100 may be used to generate panoramic video such as a spherical video, a hemispherical video, a 360 degree video, a wide angle video, a video having less than a 360 field of view, etc.

Panoramic videos may comprise a view of the environment near the camera system 100. In one example, the entire field of view 110a-110b of the panoramic video may be captured at generally the same time (e.g., each portion of the panoramic video represents the view from the camera system 100 at one particular moment in time). In some embodiments (e.g., when the camera system 100 implements a rolling shutter sensor), a small amount of time difference may be present between some portions of the panoramic video. Generally, each video frame of the panoramic video comprises one exposure of the sensor (or the multiple sensors 182a-182n) capturing the environment near the camera system 100.

In some embodiments, the field of view 110a-110b may provide coverage for a full 360 degree field of view. In some embodiments, less than a 360 degree view may be captured by the camera system 100 (e.g., a 270 degree field of view, a 180 degree field of view, etc.). In some embodiments, the panoramic video may comprise a spherical field of view (e.g., capture video above and below the camera system 100). For example, the camera system 100 may be mounted on a ceiling and capture a spherical field of view of the area below the camera system 100. In some embodiments, the panoramic video may comprise a field of view that is less than a spherical field of view (e.g., the camera system 100 may be configured to capture the ground below and the areas to the sides of the camera system 100 but nothing directly above). The implementation of the camera system 100 and/or the captured field of view 110a-110b may be varied according to the design criteria of a particular implementation.

In embodiments implementing multiple lenses, each of the lenses 150a-150n may be directed towards one particular direction to provide coverage for a full 360 degree field of view. In embodiments implementing a single wide angle lens (e.g., the lens 150a), the lens 150a may be located to provide coverage for the full 360 degree field of view (e.g., on the bottom of the camera system 100 in a ceiling mounted embodiment, on the bottom of a drone camera, etc.). In some embodiments, less than a 360 degree view may be captured by the lenses 150a-150n (e.g., a 270 degree field of view, a 180 degree field of view, etc.). In some embodiments, the lenses 150a-150n may move (e.g., the direction of the capture devices may be controllable). In some embodiments, one or more of the lenses 150a-150n may be configured to implement an optical zoom (e.g., the lenses 150a-150n may zoom in/out independent of each other).

In some embodiments, the apparatus 100 may be implemented as a system on chip (SoC). For example, the apparatus 100 may be implemented as a printed circuit board comprising one or more components (e.g., the capture devices 102a-102n, the processor 156, the communication device 154, the memory 158, etc.). The apparatus 100 may be configured to perform intelligent video analysis on the video frames of the de-warped, panoramic video. The apparatus 100 may be configured to crop and/or enhance the panoramic video.

In some embodiments, the processor 156 may be configured to perform sensor fusion operations. The sensor fusion operations performed by the processor 156 may be configured to analyze information from multiple sources (e.g., the capture devices 102a-102n, the thermal sensor 104 and the microphones 160a-160n). By analyzing various data from disparate sources, the sensor fusion operations may be capable of making inferences about the data that may not be possible from one of the disparate data sources alone. For example, the sensor fusion operations implemented by the processor 156 may analyze video data (e.g., classify objects) as well as the temperature measurements from the thermal image THIMG. The disparate sources may be used to develop a model of a scenario to support decision making. The sensor fusion operations may also provide time correlation, spatial correlation and/or reliability among the data being received.

In some embodiments, the processor 156 may implement convolutional neural network capabilities. The convolutional neural network capabilities may implement computer vision using deep learning techniques. The convolutional neural network capabilities may be configured to implement pattern and/or image recognition using a training process through multiple layers of feature-detection.

The signal DIR_AOUT may be an audio output. For example, the processor 156 may generate output audio based on information extracted from the video frames PIXELD_A-PIXELD_N. The signal DIR_AOUT may be determined based on an event and/or objects determined using the computer vision operations. In one example, the signal DIR_AOUT may comprise an audio message providing information about a temperature anomaly. In some embodiments, the signal DIR_AOUT may not be generated until an event has been detected by the processor 156 using the computer vision operations.

The signal DIR_AOUT may comprise directional and/or positional audio output information for the speakers 162a-162n. The speakers 162a-162n may receive the signal DIR_AOUT, process the directional and/or positional information and determine which speakers and/or which channels will play back particular audio portions of the signal DIR_AOUT. The speakers 162a-162n may generate the signals AOUT_A-AOUT_N in response to the signal DIR_AOUT. The signals AOUT_A-AOUT_N may be an audio message. In some embodiments, the audio message played by the speakers 162a-162n may be the early detecting warning of the potential hazard generated in response to the temperature anomaly. For example, the speakers 162a-162n may emit a pre-recorded message in response to a detected event. The signal DIR_AOUT may be a signal generated in a format that provides directional information for the signals AOUT_A-AOUT_N.

The number of speakers 162a-162n may be varied according to the design criteria of a particular implementation. The number of speakers 162a-162n may be selected to provide sufficient directional channels for the outgoing audio (e.g., the number of speakers 162a-162n implemented may be varied based on the accuracy and/or resolution of directional audio output). In an example, 1 to 6 of the speakers 162a-162n may be implemented. In some embodiments, an audio processing component may be implemented by the speakers 162a-162n to process and/or decode the output audio signals DIR_AOUT. In some embodiments, the processor 156 may be configured with on-chip audio processing.

The sensors 182a-182n may each implement a high-resolution sensor. Using the high resolution sensors 182a-182n, the processor 156 may combine over-sampling of the image sensors 182a-182n with digital zooming within a cropped area. The over-sampling and digital zooming may each be one of the video operations performed by the processor 156. The over-sampling and digital zooming may be implemented to deliver higher resolution images within the total size constraints of a cropped area.

In some embodiments, one or more of the lenses 150a-150n may implement a fisheye lens. One of the video operations implemented by the processor 156 may be a dewarping operation. The processor 156 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 156 may be configured to crop (e.g., trim to) a region of interest from a full video frame (e.g., generate the region of interest video frames). The processor 156 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the temperature measurements performed by the thermal sensor 104. For example, a high temperature may be detected at a particular location in the thermal image signal THIMG. The processor 156 may update the selected region of interest coordinates and dynamically update the cropped section based on the locations of high temperatures detected by the thermal sensor 104. The cropped section may correspond to the area of interest selected. As the area of interest changes, the cropped portion may change. For example, the selected coordinates for the area of interest may change from frame to frame, and the processor 156 may be configured to crop the selected region in each frame.

The processor 156 may be configured to perform a disparity correction between the thermal image and the video frames. In an example, there may be a disparity between the thermal image captured by the thermal sensor 104 and the video frames generated from the pixel data generated by the capture devices 102a-102n resulting from the different mounting locations of the thermal sensor 104 and the capture devices 102a-102n. In one example, the thermal image signal THIMG may comprise mounting location information (e.g., position, angle, tilt, zoom, etc.) of the thermal image sensor 104 at the time the thermal image was captured. Similarly, the signals PIXELD_A-PIXELD_N may comprise mounting location information (e.g., position, angle, tilt, zoom, etc.) of the capture devices 102a-102n at the time the pixel data was captured. In another example, the memory 158 may store pre-determined mounting location information about the thermal image sensor 104 and/or the capture devices 102a-102n (e.g., when the sensors are stationary). The processor 156 may be configured to use the mounting information to calculate the disparity between the fields of view of the thermal sensor 104 and the capture devices 102a-102n. The disparity calculated may be used to enable an accurate and aligned comparison of the information from the thermal image to the information in the video frames. The disparity calculation may be used to correlate the temperature measured at a particular location in the thermal image to the same location in the visual image. The disparity calculation may ensure that the regions of the temperature anomalies are accurately mapped to the visual image.

The processor 156 may be configured to over-sample the image sensors 182a-182n. The over-sampling of the image sensors 182a-182n may result in a higher resolution image. The processor 156 may be configured to digitally zoom into an area of a video frame. For example, the processor 156 may digitally zoom into the cropped area of interest. For example, the processor 156 may establish the area of interest based on the directional audio, crop the area of interest, and then digitally zoom into the cropped region of interest video frame.

The dewarping operations performed by the processor 156 may adjust the visual content of the video data. The adjustments performed by the processor 156 may cause the visual content to appear natural (e.g., appear as seen by a person viewing the location corresponding to the field of view of the capture devices 102a-102n). In an example, the dewarping may alter the video data to generate a rectilinear video frame (e.g., correct artifacts caused by the lens characteristics of the lenses 150a-150n). The dewarping operations may be implemented to correct the distortion caused by the lenses 150a-150n. The adjusted visual content may be generated to enable more accurate and/or reliable object detection.

Various features (e.g., dewarping, digitally zooming, cropping, etc.) may be implemented in the processor 156 as hardware modules. Implementing hardware modules may increase the video processing speed of the processor 156 (e.g., faster than a software implementation). The hardware implementation may enable the video to be processed while reducing an amount of delay. The hardware components used may be varied according to the design criteria of a particular implementation.

The processor 156 is shown comprising a number of blocks (or circuits) 190a-190n. The blocks 190a-190n may implement various hardware modules implemented by the processor 156. The hardware modules 190a-190n may be configured to provide various hardware components to implement a video processing pipeline. The circuits 190a-190n may be configured to receive the pixel data PIXELD_A-PIXELD_N, generate the video frames from the pixel data, perform various operations on the video frames (e.g., de-warping, rolling shutter correction, cropping, upscaling, image stabilization, etc.), prepare the video frames for communication to external hardware (e.g., encoding, packetizing, color correcting, etc.), parse feature sets, implement various operations for computer vision (e.g., object detection, segmentation, classification, etc.), etc. Various implementations of the processor 156 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 190a-190n may be implemented as dedicated hardware modules. Implementing various functionality of the processor 156 using the dedicated hardware modules 190a-190n may enable the processor 156 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision algorithm to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 190*a*-190*n* (e.g., 190*a*) may implement a scheduler circuit. The scheduler circuit 190*a* may be configured to store a directed acyclic graph (DAG). In an example, the scheduler circuit 190*a* may be configured to generate and store the directed acyclic graph in response to the feature set information received in the signal FEAT_SET. The directed acyclic graph may define the video operations to perform for extracting the data 120*a*-120*n* from the video frames. For example, the directed acyclic graph may define various mathematical weighting to apply when performing computer vision operations to classify various groups of pixels as particular objects.

The scheduler circuit 190*a* may be configured to parse the acyclic graph to generate various operators. The operators may be scheduled by the scheduler circuit 190*a* in one or more of the other hardware modules 190*a*-190*n*. For example, one or more of the hardware modules 190*a*-190*n* may implement hardware engines configured to perform specific tasks (e.g., hardware engines designed to perform particular mathematical operations that are repeatedly used to perform computer vision operations). The scheduler circuit 190*a* may schedule the operators based on when the operators may be ready to be processed by the hardware engines 190*a*-190*n*.

The scheduler circuit 190*a* may time multiplex the tasks to the hardware modules 190*a*-190*n* based on the availability of the hardware modules 190*a*-190*n* to perform the work. The scheduler circuit 190*a* may parse the directed acyclic graph into one or more data flows. Each data flow may include one or more operators. Once the directed acyclic graph is parsed, the scheduler circuit 190*a* may allocate the data flows/operators to the hardware engines 190*a*-190*n* and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190*a*-190*n* (e.g., 190*b*) may implement a convolutional neural network (CNN) module. The CNN module 190*b* may be configured to perform the computer vision operations on the video frames. The CNN module 190*b* may be configured to implement recognition of objects through multiple layers of feature detection. The CNN module 190*b* may be configured to calculate descriptors based on the feature detection performed. The descriptors may enable the processor 156 to determine a likelihood that pixels of the video frames correspond to particular objects (e.g., a particular make/model/year of a vehicle, etc.). The CNN module 190*b* may be configured to implement convolutional neural network capabilities. The CNN module 190*b* may be configured to implement computer vision using deep learning techniques. The CNN module 190*b* may be configured to implement pattern and/or image recognition using a training process through multiple layers of feature-detection. The CNN module 190*b* may be configured to conduct inferences against a machine learning model.

The CNN module 190*b* may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 190*b* to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190*b* using dedicated hardware circuitry may enable calculating descriptor matching distances in real time.

The CNN module 190*b* may be a dedicated hardware module configured to perform feature detection of the video frames. The features detected by the CNN module 190*b* may be used to calculate descriptors. The CNN module 190*b* may determine a likelihood that pixels in the video frames belong to a particular object and/or objects in response to the descriptors. For example, using the descriptors, the CNN module 190*b* may determine a likelihood that pixels correspond to a particular object (e.g., a person, an item of furniture, a pet, a vehicle, etc.) and/or characteristics of the object (e.g., a hood of a vehicle, a door of a vehicle, a logo of a vehicle, a license plate of a vehicle, a face of a person, clothing worn by a person, etc.). Implementing the CNN module 190*b* as a dedicated hardware module of the processor 156 may enable the apparatus 100 to perform the computer vision operations locally (e.g., on-chip) without relying on processing capabilities of a remote device (e.g., communicating data to a cloud computing service).

The computer vision operations performed by the CNN module 190*b* may be configured to perform the feature detection on the video frames in order to generate the descriptors. The CNN module 190*b* may perform the object detection to determine regions of the video frame that have a high likelihood of matching the particular object. In one example, the types of object to match against (e.g., reference objects) may be customized using an open operand stack (enabling programmability of the processor 156 to implement various directed acyclic graphs each providing instructions for performing various types of object detection). The CNN module 190*b* may be configured to perform local masking to the region with the high likelihood of matching the particular object(s) to detect the object.

In some embodiments, the CNN module 190*b* may determine the position (e.g., 3D coordinates and/or location coordinates) of various features of the detected objects. In one example, the location of the arms, legs, chest and/or eyes of a person and/or a hood, a roof, a driver side door and/or a battery location may be determined using 3D coordinates. One location coordinate on a first axis for a vertical location of the body part in 3D space and another coordinate on a second axis for a horizontal location of the body part in 3D space may be stored. In some embodiments, the distance from the lenses 150*a*-150*n* may represent one coordinate (e.g., a location coordinate on a third axis) for a depth location of the body part in 3D space. Using the location of various body parts in 3D space, the processor 156 may determine body position, and/or body characteristics of detected people.

The CNN module 190*b* may be pre-trained (e.g., configured to perform computer vision to detect objects based on the training data received to train the CNN module 190*b*).

For example, the results of training data (e.g., a machine learning model) may be pre-programmed and/or loaded into the processor 156. The CNN module 190b may conduct inferences against the machine learning model (e.g., to perform object detection). The training may comprise determining weight values for each of the layers. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels, the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogenous processing resources (all circuits 190a-190n may have the same capabilities) or heterogeneous processing resources (two or more circuits 190a-190n may have different capabilities).

Figures 3, 4:
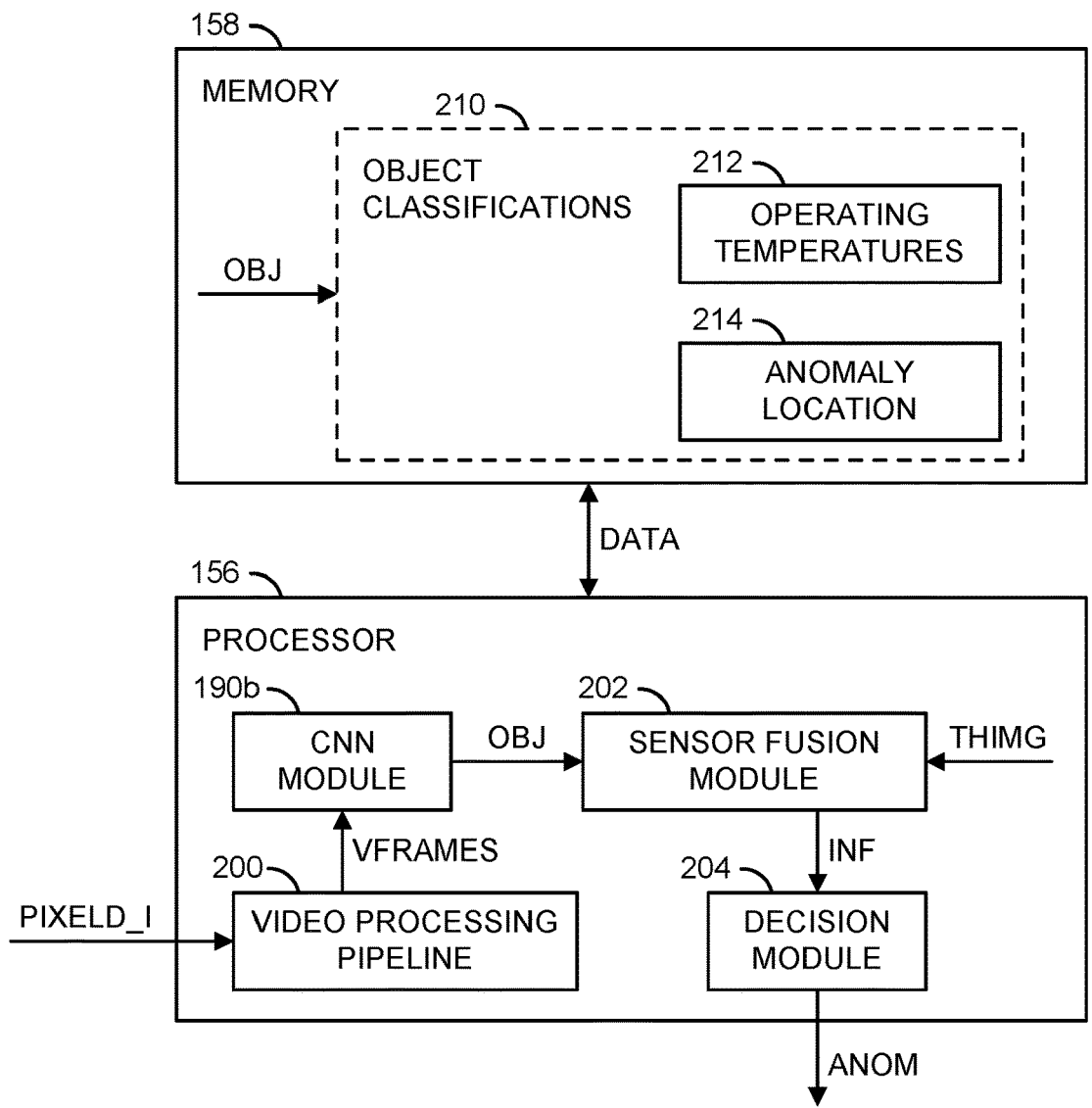
FIG. 3 is a block diagram illustrating components for performing sensor fusion to make a decision about a temperature anomaly.
FIG. 4 is a diagram illustrating example classification data.

Referring to FIG. 3, a block diagram illustrating components for performing sensor fusion to make a decision about a temperature anomaly is shown. The processor 156 and the memory 158 are shown. The signal DATA is shown communicated between the processor 156 and the memory 158. The processor 156 is shown receiving the signal PIXELD_I and generating the signal ANOM.

The processor 156 is shown comprising the CNN module 190b, a block (or circuit) 200 a block (or circuit) 202 and/or a block (or circuit) 204. The circuit 200 may implement a video processing pipeline. The circuit 202 may implement a sensor fusion module. The circuit 204 may implement a decision module. The processor 156 may comprise other components (not shown). The components of the processor 156 shown in association with FIG. 3 may generally correspond to components for combining information generated in response to the computer vision operations and the information generated by the thermal sensor 104 to provide the object-aware temperature anomaly monitoring.

The memory 158 is shown comprising a block (or circuit) 210. The block 210 may comprise data storage for object classifications. The object classifications 210 may comprise a block (or circuit) 212 and/or a block (or circuit) 214. The block 212 may comprise data storage for operating temperatures. The block 214 may comprise data storage for anomaly location. The object classifications 210, the operating temperatures 212 and/or the anomaly locations 214 may generally comprise look-up tables.

The object classifications 210 may comprise other types of data storage (not shown). The types of data stored for the object classifications 210 may be varied according to the design criteria of a particular implementation. The components of the memory 158 shown in association with FIG. 3 may generally correspond to components for combining information generated in response to the computer vision operations and the information generated by the thermal sensor 104 to provide the object-aware temperature anomalies.

The video processing pipeline 200 is shown receiving the signal PIXELD_I (e.g., generated by the capture device 102). In the example shown, only the signal PIXELD_I is shown. However, the video processing pipeline 200 may be configured to receive any number of the pixel data signals PIXELD_A-PIXELD_N. The video processing pipeline 200 is shown generating a signal (e.g., VFRAMES). The signal VFRAMES may comprise video frames generated by the video processing pipeline. The signal VFRAMES may be presented to the CNN module 190b.

The video processing pipeline 200 may be configured to perform video processing on the pixel data received from the capture devices 102a-102n. The video processing performed by the video processing pipeline 200 may be configured to generate the video frames from the pixel data. In one example, the video frames generated by the video processing pipeline 200 may be used internally by other components of the processor 156 (e.g., for computer vision operations). In another example, the video frames generated by the video processing pipeline 200 may be streamed to another device (e.g., the communication device 154 may communicate the signal VFRAMES). In yet another example, the video frames generated by the video processing pipeline 200 may be provided to a display device (e.g., a monitor). In the example shown, the signal VFRAMES may communicate the video frames generated by the video processing pipeline 200 to the CNN module 190b to perform computer vision operations on the video frames.

The video pipeline 200 may be configured to encode video data and/or video frames captured by each of the capture devices 102a-102n. In some embodiments, the video pipeline 200 may be configured to perform video stitching operations to stitch the pixel data PIXELD_A-PIXELD_N captured by each of the capture devices 102a-102n using the lenses 112a-112n to generate a panoramic field of view (e.g., the panoramic video frames). The video pipeline 200 may be configured to generate the video frames VFRAMES and perform further operations on the video frames VFRAMES. The video pipeline 200 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 200 may enable the video operations to be performed on high resolution video and/or high bitrate video data in real-time and/or near real-time. The video pipeline module 200 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 200 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 200 may be compressed (e.g., using a lossless compression and/or a low amount of lossiness). The type of video operations and/or the type of video data operated on by the video pipeline 200 may be varied according to the design criteria of a particular implementation.

The video pipeline module 200 may implement a digital signal processing (DSP) module configured to receive information (e.g., pixel data values captured by the sensors 182a-182n) from the input signals PIXELD_A-PIXELD_N. The video pipeline module 200 may be configured to determine the pixel values (e.g., RGB, YUV, luminance, chrominance, etc.). The video pipeline module 200 may be configured to perform image signal processing (ISP). The video pipeline module 200 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 200 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 200 may receive encoded and/or unencoded (e.g., raw) audio data from an audio interface. The video pipeline module 200 may also receive encoded audio data from a communication interface (e.g., USB and/or SDIO via the signal DIR_AUD). The video pipeline module 200 may provide encoded video data to the communication devices 154 (e.g., using a USB host interface) and/or displays.

The video pipeline module 200 may be configured to implement a raw image pipeline for image signal processing. The video pipeline module 200 may be configured to convert image data acquired from the capture devices 102a-102n. For example, the image data may be acquired from the image sensor 182i in a color filter array (CFA) picture format. The raw image pipeline implemented by the video pipeline module 200 may be configured to convert the CFA picture format to a YUV picture format.

The raw image pipeline implemented by the video pipeline module 200 may be configured to perform demosaicing on the CFA formatted image data to obtain linear RGB (red, green, blue) image data for each picture element (e.g., pixel). The raw image pipeline implemented by the video pipeline module 200 may be configured to perform a white balancing operation and/or color and tone correction. The raw image pipeline implemented by the video pipeline module 200 may be configured to perform RGB to YUV color space conversion. The raw image pipeline implemented by the video pipeline module 200 may be configured to perform noise filtering (e.g., noise reduction, noise correction, etc.) and/or sharpening. The raw image pipeline implemented by the video pipeline module 200 may be configured to implement tone based non-smoothness detection and adjustment. Generally, noise filtering may be performed after each step, operation, and/or conversion performed to reduce any noise introduced by each step.

The video pipeline module 200 may implement scheduling. Scheduling may enable the video pipeline 200 to perform various discrete, asynchronous video operations and/or computer vision operations in parallel. The scheduling may enable data results from one video operation to be available by the time another video data operation needs the data results. The video pipeline module 200 may comprise multiple pipelines, each tuned to perform a particular task efficiently. For example, each of the multiple pipelines may utilize one or more of the dedicated hardware modules 190a-190n.

The CNN module 190b is shown receiving the signal VFRAMES from the video processing pipeline 200. The CNN module 190b may generate a signal (e.g., OBJ). The signal OBJ may be presented to the sensor fusion module 202. The signal OBJ may be presented to the object classifications storage 210.

The CNN module 190b may be configured to perform the computer vision operations on the video frames. The computer vision operations may be performed in response to the signal VFRAMES received from the video processing pipeline 200. The CNN module 190b may be configured to detect objects, classify objects and/or determine characteristics or features of the detected objects. The CNN module 190b may generate the signal OBJ in response to detecting the objects in the video frames.

The CNN module 190b may be configured to perform the computer vision operations. The computer vision operations may comprise segmentation, object detection and/or classification of the video frames VFRAMES. The video processing pipeline 200 may be configured to perform video processing. The video processing performed by the video processing pipeline 200 may be a distinct process from the computer vision operations. The video processing may be configured to generate the video frames VFRAMES that may be used for the computer vision operations. The video processing operations may generate encoded video frames that may be output to a display and unencoded video frames that may be used for the computer vision operations.

The object classifications storage 210 may comprise one or more lookup tables. In an example, the operating temperatures storage 212 and/or the anomaly location storage 214 may each implement lookup tables. The objects classifications storage 210 may be configured to provide data in response to the signal OBJ. In one example, the CNN module 190b may be configured to classify the objects in the video frames VFRAMES and provide the signal OBJ to the objects classifications lookup data 210. The objects classifications lookup data 210 may generate data that corresponds to the objects classified by the CNN module 190b. In another example, the CNN module 190b may be configured to detect various features in the video frames VFRAMES and the objects classifications lookup data 210 may be compared to the features detected to classify the objects as particular types/classes of object and then generate the data that corresponds to the objects classified.

The objects classifications storage 210 may comprise data that corresponds to particular types (e.g., classes) of objects. The data may comprise the operating temperatures 212. In some embodiments, the operating temperatures 212 may be configured to store information about normal operating temperature ranges of particular objects. The normal operating temperature ranges may comprise a minimum and/or maximum temperature values for particular objects and/or features of objects. In an example, the normal operating temperature ranges may be a recommended and/or safe operating temperature (e.g., as suggested by a manufacturer and/or regulator of the object/feature). In one example, one object classification may be particular model of electric vehicle that may have a normal operating temperature range of −20 C to 60 C. In some embodiments, the operating temperatures 212 may be configured to store information about changes in temperature. In one example, one object classification may be a particular model of electric vehicle that may change temperature over time, but may indicate that an anomalous temperature change may be a rapid change in temperature (e.g., 10 degree increase within a minute). Each class of object may have a corresponding operating temperature stored in the operating temperatures lookup table 212. The particular ranges of temperatures considered normal and/or anomalous may be varied according to the design criteria of a particular implementation.

The objects classifications storage 210 may comprise data that corresponds to particular features and/or characteristics of objects. The data may comprise the anomaly location data 214. The anomaly location data 214 may comprise locations of particular types of classes of objects that may be likely to have a temperature anomaly (e.g., areas of potential concern). The anomaly location 214 may comprise information about particular types of materials used by the object class (e.g., combustible materials) and/or where the particular materials are located on the class of objects. The anomaly location data 214 may store data that may be used to distinguish which high temperature detections correspond to false alarms and/or which high temperature detections correspond to temperature anomalies. In one example, the feature and/or characteristic of the object class stored by the anomaly location data 214 may be a battery (e.g., for an electric vehicle, for a battery storage unit, etc.). In another example, the feature and/or characteristic of the object class stored by the anomaly location data 214 may be a gas tank (e.g., for a vehicle with an internal combustion engine). In yet another example, the feature and/or characteristic of the object class stored by the anomaly location data 214 may be other components of a vehicle and/or the temperatures associated with the particular component (e.g., the roof may heat up to 70 C, the hood may heat up to 80 C, the interior of the vehicle may heat up to 60 C, etc.). The types of features and/or the temperatures associated with each feature may be varied according to the design criteria of a particular implementation.

In some embodiments, temperature anomalies may be associated with particular locations of a class of object. In one example, a class of object detected may be a vehicle. A high temperature may be detected by the thermal sensor 104 on the roof of the detected vehicle. However, when outdoors the sun may cause the roof of a vehicle to become very hot, which may be a benign, expected and generally safe increase in temperature. In another example, a class of object detected may be an EV and the anomaly location 214 may indicate that the EV battery may be located on a bottom of the EV. A rapid temperature increase on the bottom of the EV (e.g., the location that corresponds to the anomaly location data 214) may indicate a temperature anomaly and/or a potential fire hazard. The operating temperatures 212 may be associated with the anomaly locations 214. For example, a temperature above 60 C may be considered normal and/or acceptable for the roof of a vehicle, but may be considered a temperature anomaly for the location of a car battery.

The object classifications data 210 may be configured to provide information about operating temperatures and/or locations of particular features of particular classes of objects to the processor 156. The information generated by the objects classifications data 210 may be communicated using the signal DATA. In one example, the CNN module 190b may detect a particular make/model of electric vehicle. The object classifications 210 may be used to look up the operating temperatures 212 for the particular make/model of electric vehicle. The anomaly location 214 may be used to determine the location of the EV battery. The operating temperature range and/or the location of various features of the electric vehicle, such as the battery, may be communicated to the processor 156.

The sensor fusion module 202 may be configured to analyze various sources of data simultaneously. The sensor fusion module 202 may receive the signal OBJ from the CNN module 190b and the signal THIMG from the thermal sensor 104. The sensor fusion module 202 may be configured to analyze data and/or intelligently combine results from the image data (e.g., the video frames VFRAMES and/or the objects detected OBJ) and the thermal image (e.g., the temperature measurements performed by the thermal sensor 104). The sensor fusion module 202 may be further configured to use the information from the object classifications lookup table 210. The information from the object classifications lookup table 210 may be used to analyze data with respect to the particular class of object detected.

The sensor fusion module 202 may be configured to make inferences based on the combination of data sources. The sensor fusion module 202 may be configured to generate a signal (e.g., INF). The signal INF may comprise the inferences made by the sensor fusion module 202. The signal INF may be presented to the decision module 204.

The sensor fusion module 202 may be configured to analyze information from the capture devices 102a-102n (e.g., RBG image data), the thermal sensor 104 (e.g., a thermal image) and/or the object classifications data 210. By analyzing various data from disparate sources, the sensor fusion module 202 may be capable of making inferences about the data that may not be possible from one of the data sources alone. For example, the sensor fusion module 202 may analyze video data as well as radar, lidar, inertial, motion, V2X, location data (e.g., GPS, GNSS, ADAS, etc.), thermal data and/or other sources to develop a model of a scenario to support decision making. The sensor fusion module 202 may also provide time correlation, spatial correlation and/or reliability among the data being received by the processor 156.

In an example, the sensor fusion module 202 may spatially overlay an object captured by the camera 102i with the same object captured by the thermal sensor 104 for better identification and/or localization of a temperature for a detected object. In a time correlation example, an object may be seen by two sensors (e.g., RGB camera and thermal) at slightly different times and/or slightly different angles. The sensor fusion module 202 may time shift the data from one sensor to align with the data from the other sensor (e.g., using the disparity calculation based on the locations and/or mounting information of each sensor).

In a reliability example, the sensor fusion module 202 may determine the reliability of objects detected by each sensor.

The sensor fusion module 202 may adjust the weighting used to overlay the data to give more weight to reliable data and/or less weight to unreliable data (e.g., one of the capture devices 102a-102n may have low reliability in foggy conditions, but thermal data may still have good reliability in foggy conditions). A confidence that the object is really there and is correctly identified may also be calculated in the sensor fusion module 202.

The sensor fusion module 202 may aggregate data from the thermal sensor 104, the microphones 160a-160n, the CNN module 190b and/or the video pipeline 200 to build a model and/or abstraction of the environment around the detected objects. The computer vision operations may enable the processor 156 to understand the environment, a state of objects, relative positions of objects and/or a meaning of objects to derive inferences (e.g., detect that a vehicle is in the shade, detect that a vehicle is in direct sunlight, detect that a vehicle has been recently been driven and may have a higher temperature, understand that a vehicle is unattended, etc.). The sensor fusion module 202 may enable a comparison and/or cross-reference of the data received from the thermal sensor 104 at a particular time to the video data captured at another particular time in order to adjust a confidence level of an inference. The type of inferences made by the sensor fusion module 202 may be varied according to the design criteria of a particular implementation.

The sensor fusion module 202 may be further configured to mathematically weight the information received from the computer vision operations (e.g., modify coefficients to represent how likely the detections made by the computer vision operations are correct based on the detections made based on other sensors). For example, the sensor fusion module 202 may be configured to mathematically weight the information provided by each sensor (e.g., a confidence level of the computer vision detection, a confidence level of the detection of the thermal sensor 104, the distance limitations of the thermal sensor 104, whether the computer vision detects the object at a distance beyond the range of the thermal sensor 104, etc.).

The decision module 204 may be configured to determine whether to generate the control/warning signal. The decision module 204 may analyze the inferences made by the sensor fusion module 202. The decision module 204 may be configured to compare the inferences made by the sensor fusion module 202 to various policy data to determine whether a temperature anomaly has been detected. For example, the policy data may indicate whether to be more conservative (e.g., avoid generating false alarms) or more proactive (e.g., prefer generating warnings). The policy data may be a distinct aspect of the apparatus 100 from the computer vision, video processing and/or thermal imaging. The decision module 204 may receive the signal from the sensor fusion module 202 and generate the signal ANOM.

The decision module 204 may be configured to generate the signal ANOM to indicate a temperature anomaly has been detected. The signal ANOM may be used to initiate an early warning (e.g., to be communicated by the communication device 154). The decision module 204 may be configured to use the information from the computer vision operations and/or the sensor fusion module 202 to determine which actions may be taken. For example, the decision module 204 may determine which object is associated with the detected temperature anomaly. The decision module 204 may utilize data from the CNN module 190b and/or computer vision data using a histogram oriented gradient (HOG). The sources of data for making decisions used by the decision module 204 may be varied according to the design criteria of a particular implementation.

Referring to FIG. 4, a diagram illustrating example classification data is shown. The object classification data 210, the operating temperature data 212 and/or the anomaly location data 214 are shown in a tabular format as a representative example of the lookup table data. The format of the lookup table and/or the arrangement of the object classification data 210, the operating temperature data 212, the anomaly location data 214 in the memory 158 and/or other data stored in the memory 158 may be varied according to the design criteria of a particular implementation. Object types 250a-250n are shown. The object types 250a-250n are shown as representative examples. The object type 250a may have a classification 210 of EV model A (e.g., one make/model of an electric vehicle). The object type 250b may have a classification 210 of EV model B (e.g., another make/model of an electric vehicle). The object type 250n may have a classification 210 of a power storage unit (e.g., a large battery pack used to store power and supply power to a building, a charging station, etc.). The classification 210 may be a broad classification (e.g., detecting an electric vehicle), a relatively narrower classification (e.g., detecting a make/model of electric vehicle) and/or a specific classification (e.g., detecting a particular vehicle (e.g., using a license plate and/or other identifiable features to distinguish between individual vehicles of the same make/model)).

The object types 250a-250n are shown having an operating temperature 212 and an anomaly location 214. In the example shown, the object type 250a may have an operating temperature 212 of −20 C to 60 C and an anomaly location 214 of a front bottom of the vehicle (e.g., the EV battery may be located at the bottom of the vehicle at the front end). In the example shown, the object type 250b may have an operating temperature 212 of −10 C to 55 C and an anomaly location 214 of a rear bottom of the vehicle (e.g., the EV battery may be located at the bottom of the vehicle at the rear end). In the example shown, the object type 250c may have an operating temperature 212 of −25 C to 65 C and an anomaly location 214 of the entire unit (e.g., the entire power supply may be a large battery pack).

The camera system 100 may be configured to detect the temperature anomaly based on the specific class of the objects detected. In the example shown, each of the object types 250a-250n may have similar but different normal operating temperatures and/or anomaly locations. Since the object types 250a-250n may have different normal operating and/or anomaly locations, the criteria analyzed by the camera system 100 to determine whether a temperature anomaly has been detected may be different for each object. For example, if a temperature of 59 C is detected for the object type 250b, then the decision module 204 may generate the signal ANOM. However, the same temperature of 59 C detected for the object type 250a and/or the object type 250n may not be considered a temperature anomaly. In another example, if a temperature of 70 C is detected on the front bottom of the object type 250a, then the decision module 204 may generate the signal ANOM (e.g., based on the location of the anomaly location 214). However, the same temperature of 70 C detected on the front bottom of the object type 250b may not be considered a temperature anomaly (e.g., the anomaly location 214 for the object type 250b may be the rear bottom and not the front bottom).

In the example shown, the operating temperature data 212 is shown as temperature ranges. Generally, for generating the signal ALERT for a fire hazard, the lower bound of the temperature range may not be relevant. For example, the processor 156 may determine whether the temperature measurement performed by the thermal sensor 104 has exceeded the upper bound of the temperature range (e.g., a temperature measurement greater than 60 C for the object type 250a).

In some embodiments, the operating temperature data 212 may comprise one or both of the temperature range and a temperature rate of change. The temperature rate of change may comprise a threshold for how quickly the temperature may increase over a particular period of time. In one example, the operating temperature 212 for one or more of the types of objects 250a-250n may be a rate of change of 10 C over one minute. Each of the object types 250a-250n may have a specific rate of change. For example, the processor 156 may detect a temperature anomaly for the object type 250a in response to detecting a temperature measurement by the thermal sensor 104 of either greater than 60 C or a rate of change in temperature of 10 C over a one minute period of time. The particular temperature ranges and/or temperature rates of change that may correspond to a temperature anomaly may be varied according to the design criteria of a particular implementation.

The camera system 100 may be configured to determine whether temperature anomalies have occurred specific to particular classes of objects detected. The camera system 100 may be configured to determine that a temperature anomaly has occurred based on general criteria. The general criteria may be the policy data implemented by the decision module 204. In an example, the processor 156 may determine that a temperature anomaly has occurred if a temperature of 120 C has been detected regardless of the class of object detected. The general criteria may be relied on as fallback data in the event that a particular class of object has been misclassified by the CNN module 190b.

Figure 5:
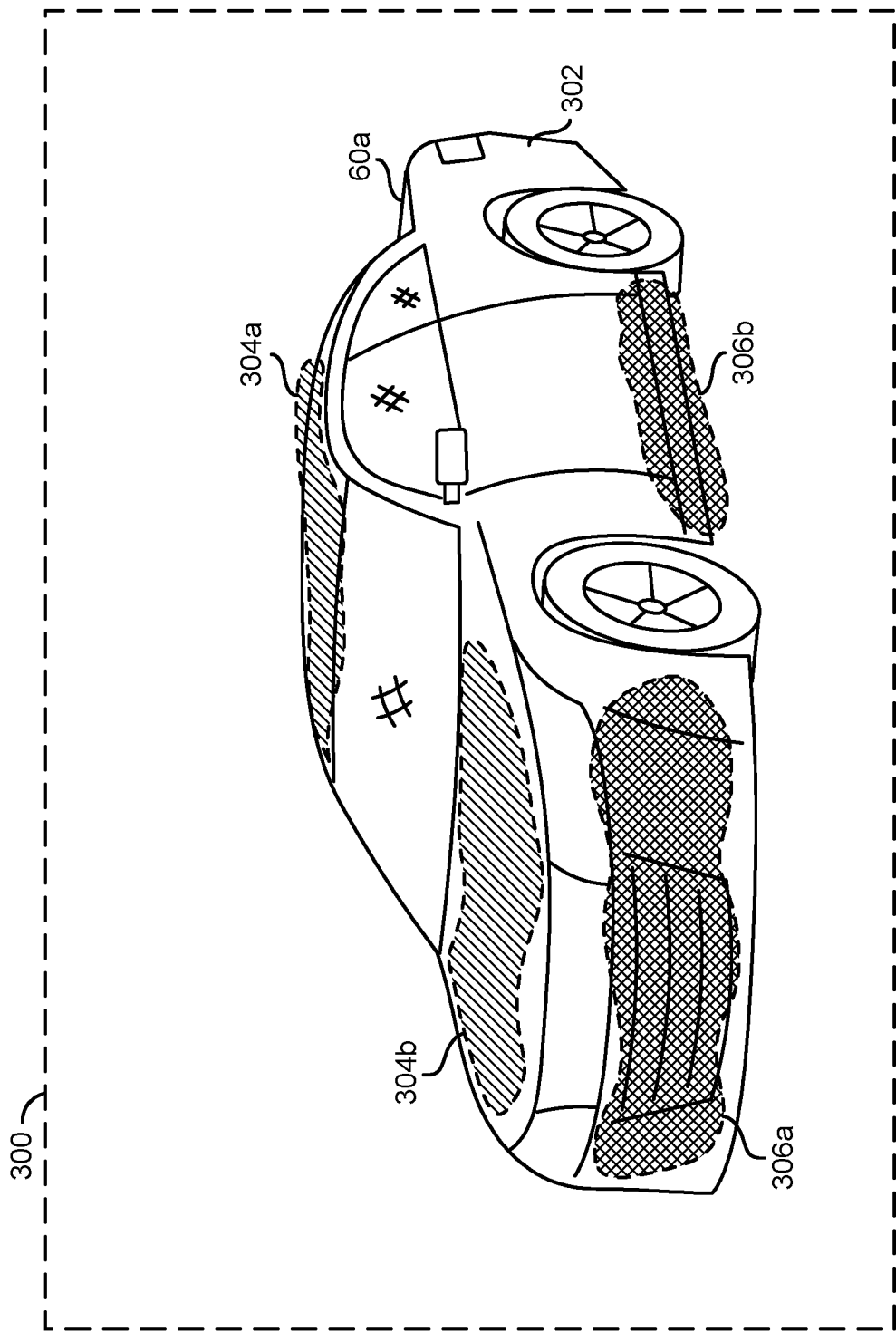
FIG. 5 is a diagram illustrating an example thermal image.

Referring to FIG. 5, a diagram illustrating an example thermal image is shown. A thermal image 300 is shown. The thermal image 300 may be a representative example of a thermal image generated by the thermal sensor 104. In an example, the thermal image 300 may be part of the data in the signal THIMG communicated to the processor 156.

The thermal image 300 may comprise various regions of temperature measurements performed by the thermal sensor 104. The thermal image 300 may provide a low resolution of data. For example, the low resolution of data may provide temperature measurements of areas that may provide a general visual representation of the thermal monitoring region 112a-112b. However, the low resolution data may not provide a sufficient level of detail to identify specific objects and/or identify particular characteristics of an object. The low resolution data of the thermal image may be insufficient for computer vision operations. The vehicle 60a is shown in the thermal image 300. For illustrative purposes, only temperature regions associated with the vehicle 60a are shown. However, the thermal image 300 may generally comprise temperature regions throughout the entire thermal image 300.

The vehicle 60a is shown in the example thermal image 300. The resolution of the data in the signal THIMG may not be sufficient to indicate the presence of the vehicle 60a. With the data in the thermal image 300 alone, the presence of the vehicle 60a may not be known. The thermal image 300 may provide regions of temperature measurements without providing data about the objects in the thermal image 300. The sensor fusion module 202 may be configured to infer the types of objects in the thermal image 300 based on the temperature regions. However, the objects and/or classification of the objects may be determined in response to the computer vision operations performed on the video frames VFRAMES (e.g., the RBG images).

A temperature measurement region 302, temperature measurement regions 304a-304b and/or temperature measurement regions 306a-306b are shown on the vehicle 60a. The temperature measurement regions 302-306b may represent temperature measurements performed by the thermal sensor 104. The temperature measurement regions 302-306b may represent regions of the vehicle 60a that have similar temperatures. For example, areas of the vehicle 60a with the temperature region 302 may have a similar temperature, areas of the vehicle 60a with the temperature regions 304a-304b may have a similar temperature and areas of the vehicle 60a with the temperature regions 306a-306b may have a similar temperature. However, the temperature of the temperature region 302 may be different from the temperature of the temperature regions 304a-304b, which may both be different from the temperature of the temperature regions 306a-306b. The temperature regions 302-306b shown on the vehicle 60a may be different temperatures than temperature regions that do not correspond to the vehicle 60a (not shown). The particular temperature of the various temperature regions 302-306b may be varied according to the design criteria of a particular implementation.

The temperature measurement region 302 may be represented by the unshaded areas of the vehicle 60a. The temperature measurement region 302 may represent areas of the vehicle 60a that have a lowest (e.g., coolest) temperature measurement read by the thermal sensor 104. For example, the temperature measurement region 302 may comprise the rear end and driver side door of the vehicle 60a.

The temperature measurement regions 304a-304b may be represented by the areas of the vehicle 60a with linear hatching. The temperature measurement regions 304a-304b may have a higher temperature (e.g., hotter) than the temperature region 302. The temperature measurement regions 304a-304b may be temperature measurements within the normal operating temperature range 212 for the class of the vehicle 60a. In one example, the temperature measurement regions 304a-304b may have a relatively stable temperature (e.g., not increasing). In the example shown, the temperature measurement region 304a may correspond to the roof of the vehicle 60a and the temperature measurement region 304b may correspond to the hood of the vehicle 60a. For example, direct sunlight shining on the roof and hood of the vehicle 60a may be the cause of the increased temperature in the temperature measurement regions 304a-304b.

The temperature measurement regions 306a-306b may be represented by the areas of the vehicle 60a with crosshatching. The temperature measurement regions 306a-306b may have a highest temperature (e.g., hottest). In one example, the temperature measurement regions 306a-306b may be temperature measurements above the normal operating temperature range 212 for the class of the vehicle 60a. In another example, the temperature measurement regions 306a-306b may be areas that are rapidly increasing in temperature. In the example shown, the temperature measurement region 306a may correspond to the front bottom of the vehicle 60a and the temperature measurement region 306b may correspond to the bottom of the vehicle 60a. For example, EV battery of the vehicle 60a may be the cause of the temperature anomaly in the temperature measurement regions 306a-306b.

The temperature measurement regions 304a-304b and/or the temperature measurement regions 306a-306b may not exactly cover the vehicle 60a. For example, the temperature measurement region 304a is shown extending beyond the roof of the vehicle 60a. In another example, the temperature measurement region 306b is shown extending below the bottom of the vehicle 60a. Since the temperature measurements performed by the thermal sensor 104 does not determine the objects in the thermal image 300, the temperature measurements may not exactly correspond to the location of the vehicle 60a in the thermal image 300. Heat may be emitted and/or radiate from surfaces of objects. The radiating heat may be detected the thermal sensor 104. Without the addition of computer vision operations performed by the processor 156, the thermal measurements 302-306b may not accurately indicate the shape and/or location of an object.

The thermal sensor 104 may be configured to continually monitor the thermal monitoring region 112a-112b. The thermal sensor 104 may provide the temperature measurements 302-306b over time to generate a temperature curve (e.g., a long term analysis over a number of hours). The thermal sensor 104 may be configured to provide the temperature measurements 302-306b as short term measurements (e.g., a temperature curve over a range of a few minutes in order to detect rapid temperature increases).

Using the temperature measurements 302-306b in the thermal image 300 alone to determine the presence of a temperature anomaly may result in false positives. In the example shown, two regions 306a-306b may have a very high temperature. However, only one (or none) may correspond to a feature of the vehicle 60a that may result in a hazard (e.g., a fire hazard). Without knowledge of the class of the detected object determined from the computer vision operations, which of the normal operating temperature data 212 to use to determine whether there is a temperature anomaly may not be known.

Figure 6:
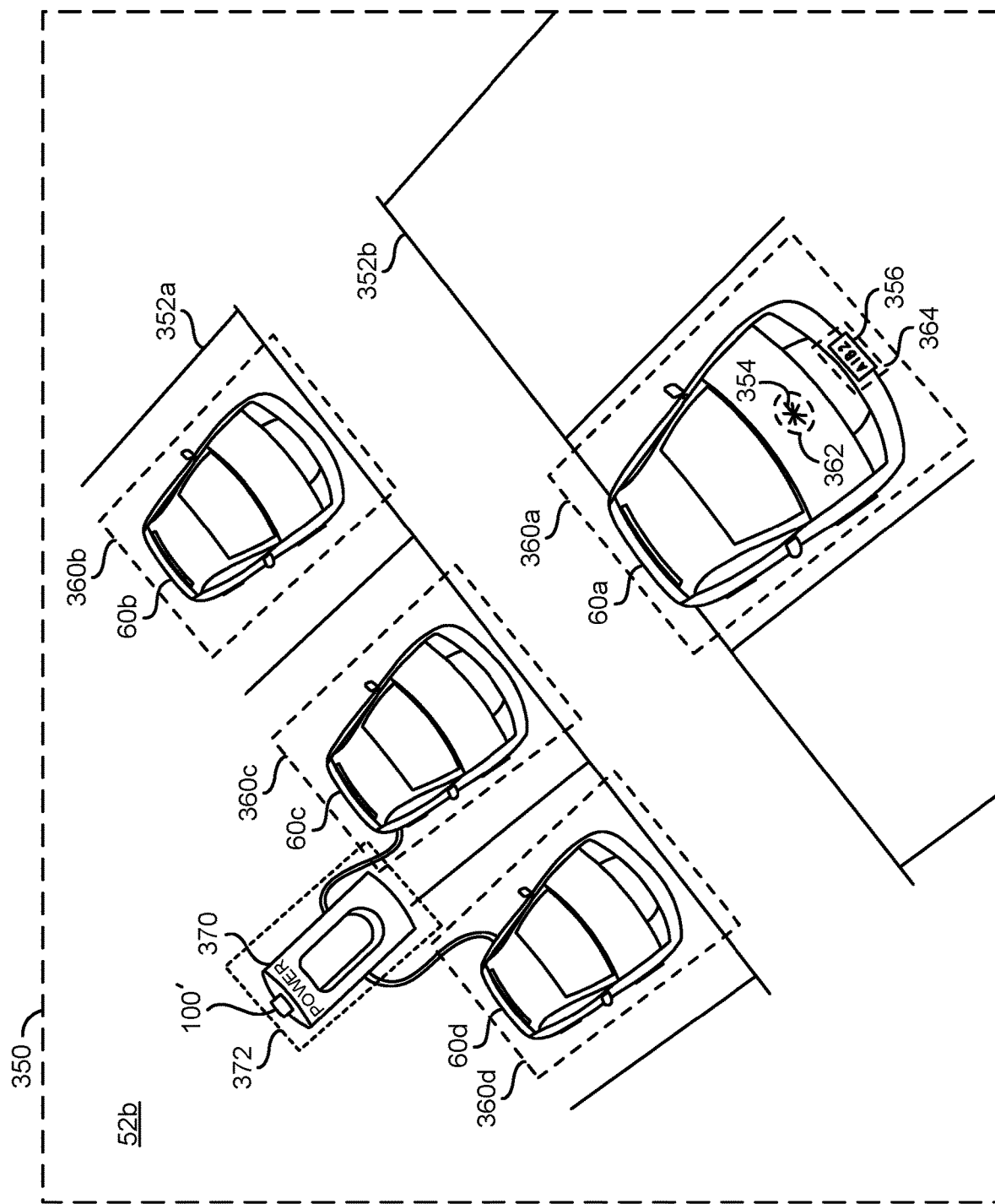
FIG. 6 is a diagram illustrating object detection and/or classification.

Referring to FIG. 6, a diagram illustrating object detection and/or classification is shown. An example video frame 350 is shown. The example video frame 350 may be one of the video frames VFRAMES. The video frame 350 may be generated in response to one or more of the capture devices 102a-102n. For example, the video frame 350 may comprise a view corresponding to the region of interest 110a-110b. For example, the capture devices 102a-102n may generate the signals PIXELD_A-PIXELD_N (e.g., pixel data), the video processing pipeline 200 of the processor 156 may generate the video frame 350 in response to the pixel data (e.g., the video processing operations). In the example shown, the video frame 350 may provide a different example scenario than the thermal image 300 shown in association with FIG. 5. The different scenarios for the thermal image 300 and the video frame 350 are shown for illustrative purposes. Generally, the thermal image 300 and the video frame 350 captured by the same camera system 100 may provide a view of the same scenario from generally the same perspective. The video frame 350 may represent an example RBG image.

The video frame 350 may provide a high resolution of data. For example, the high resolution of data may provide details for a visual representation of the region of interest 110a-110b. In an example, the high resolution of data may be a 1080p resolution, a 1440p resolution, a 4K resolution, an 8K resolution, etc. The high resolution data may provide a sufficient level of detail to identify specific objects, classify objects and/or identify particular characteristics of an object. While, the high resolution data of the video frame 350 may provide a sufficient amount of data for computer vision operations, the visual data of the video frame 350 may not provide temperature data. The CNN module 190b may be configured to perform the computer vision operations on the video frame 350. For example, the computer vision operations may be performed after the video processing operations have started (e.g., performed on the video frames as they are generated by the video processing operations).

The video frame 350 may comprise the ground 52b and the vehicles 60a-60d. Parking lines 352a-352b are shown on the ground 52b. In the example shown, the vehicles 60b-60d are shown parked within the parking lines 352a and the vehicle 60a is shown parked within the parking lines 352b. For example, each of the vehicles 60a-60d may be unattended vehicles. The vehicle 60a is shown comprising an identifier 354 and a license plate 356. In an example, the identifier 354 may be a vehicle logo. In another example, the identifier 354 may be a sticker, a decal, a dent, a scratch, etc.

Dotted boxes 360a-360d are shown. The dotted boxes 360a-360d are each shown around a respective one of the vehicles 60a-60d. The dotted boxes 360a-360d may represent the object detection (e.g., bounding boxes) of the computer vision operations performed by the CNN module 190b. The dotted boxes 360a-360d may represent that the CNN module 190b has detected the respective vehicles 60a-60d as objects. While only the detected vehicles 360a-360d are shown as detected objects as a representative example, the CNN module 190b may detect other objects (e.g., the parking lines 352a-352b, pedestrians, cyclists, trees, street signs, billboards, etc.). The number and/or types of objects detected in each of the video frames VFRAMES may be varied according to the design criteria of a particular implementation.

The dotted boxes 360a-360d are shown for illustrative purposes. For example, if the video processing pipeline 200 outputs encoded video frames to a display, the dotted boxes 360a-360d may not be shown. In some embodiments, the dotted boxes 360a-360d may be displayed on video frames output to a display (e.g., as part of a debugging process to indicate which objects have been detected by the processor 156).

The CNN module 190*b* may be configured to perform the object detection on the video frame 350. The CNN module 190*b* may be configured to classify the detected objects 360*a*-360*d*. In one example, the CNN module 190*b* may be configured to classify each of the vehicles 60*a*-60*d* as a vehicle object type. In some embodiments, the CNN module 190*b* may be configured to classify the vehicles 60*a*-60*d* as particular types of vehicles. In one example, the CNN module 190*b* may classify one or more of the vehicles broadly (e.g., a truck, a sedan, a SUV, a van, an internal combustion engine vehicle, an EV, etc.). In another example, the CNN module 190*b* may be configured to perform a fine-grained classification (e.g., identify a vehicle as a particular make/model/year). In yet another example, the CNN module 190*b* may be configured to perform a specific classification (e.g., identify the vehicle 60*a* as a particular vehicle distinguishable from all other vehicles regardless of make/model/year). The level of classification performed by the CNN module 190*b* may be varied according to the design criteria of a particular implementation.

A dotted shape 362 and a dotted shape 364 are shown. The dotted shapes 362-364 may represent the analysis of characteristics of the detected object 360*a*. In an example, the CNN module 190*b* may be configured to detect characteristics of the detected objects 360*a*-360*d* in order to perform the classification and/or to perform a fine-grained classification.

In one example, if the identifier 354 is a vehicle logo, the analysis of the characteristic 362 may comprise identifying the logo 354 (e.g., matching the detected logo 354 to a logo in a library of known logos). The logo 354 may be used to identify a particular make/model/year of the vehicle 60*a*. The make/model/year may be compared to a library of known vehicles to indicate whether the vehicle 60*a* is an EV. In another example, if the identifier 354 is a scratch, the analysis of the characteristic 362 may comprise identifying the scratch 354. The scratch 354 may be used to identify the vehicle 60*a* as a particular vehicle. For example, if the vehicle 60*a* and the vehicle 60*b* are the same make/model/year of vehicle, the scratch 354 may be used to distinguish the vehicle 60*a* from the vehicle 60*b*.

In one example, detected characteristic 364 may be the license plate 356. The CNN module 190*b* and/or the processor 156 may be configured to perform OCR to read the license plate 356. By reading the license plate 356, the processor 156 may distinguish the vehicle 60*a* as a particular vehicle. In some embodiments, the communication device 154 may have access to communicate with a vehicle database (e.g., a remote source of data). For example, the communication device 154 may query the vehicle database using the data read from the license plate 356. The result of the query of the vehicle database may provide the vehicle make/model/year and/or owner of the detected vehicle 360*a*. The information from the vehicle database may help classify the detected vehicle 360*a*. In some embodiments, the signal ALERT may be provided to the owner of the vehicle 60*a* based on the license plate information (e.g., a personalized warning that a temperature anomaly has been detected). In some embodiments, the detected characteristic 364 of the license plate 356 may provide an indication of whether the vehicle 60*a* is an electric vehicle or not (e.g., the license plate may indicate that the vehicle is an EV).

A station 370 is shown. In one example, the station 370 may be an electric charging station (e.g., for charging electric vehicles). In another example, the station 370 may be a re-fueling station (e.g., a gas station). In the example shown, the station 370 may be an electric charging station connected to the electric vehicles 60*c*-60*d*. The electric charging station 370 may be providing a recharge to the electric vehicles 60*c*-60*d*.

The camera system 100' is shown mounted to the electric charging station (e.g., the camera system 100' may not be the camera system 100 that captured the example video frame 350). The camera system 100' may be configured similar to the camera system 100. The camera system 100' may be configured to monitor for temperature anomalies of vehicles connected to the electric charging station 370. For example, the camera system 100' may monitor the temperature of the vehicle 60*c* and the vehicle 60*d* to detect for indications of thermal runaway (e.g., rapidly increasing heat) while the vehicles 60*c*-60*d* are being charged by the electric charging station 370. In an example, in a parking lot scenario with multiple electric charging stations, each of the charging stations may comprise the camera system 100 configured to perform object-aware temperature monitoring of vehicles receiving power (e.g., recharging) from the electric charging stations.

In some embodiments, the charging station 370 may be attached to a pole and the camera system 100' may be mounted to the pole attached to the charging station 370. The camera system 100' may monitor temperature and provide early warning of a potential fire hazard and also serve as a surveillance camera. For example, the CNN module 190*b* may be further configured to detect people and/or determine a behavior of a person and/or people detected (e.g., to detect car break-ins, vandalism, theft, etc.). The signal FEAT_SET may provide feature set data for detecting security surveillance issues in addition to the temperature monitoring. The signal ANOM may be used to provide early warnings for potential fire hazards and/or alarms when particular behavior is detected using computer vision (e.g., theft, vandalism, arson, etc.).

A dotted box 372 is shown. The dotted box 372 may represent the object detection and/or classification of the station 370. In an example, the camera system 100 may detect the charging station 370 as an object and monitor for temperature anomalies that may occur in the charging station 370. For example, the charging station 370 may be a power storage unit. The charging station 370 may be classified based on the object classifications 210. The charging station 370 may have different normal operating temperatures 212 and/or anomaly locations 214 than the detected objects 360*a*-360*d* that have a different classification.

The detected objects 360*a*-360*d* (and the characteristics 362-364 and the detected object 370) may be localized on the video frame 350. The processor 156 may be configured to determine where in the region of interest 110*a*-110*n* each of the detected objects 360*a*-360*d* (and the characteristics 362-364 and the detected object 370) are located. The localization may enable the sensor fusion module 202 to compare the locations of the temperature measurement regions 302-306*b* from the thermal image 300 to the locations of the detected objects 360*a*-360*d* (and the characteristics 362-364 and the detected object 370) in the visual image 350.

The classification of the detected objects 360*a*-360*d* may be used to determine the normal operating temperatures for the detected objects 360*a*-360*d*. The location of the detected objects 360*a*-360*d*, the information about normal operating temperatures of the detected objects 360*a*-360*d* determined from the classification and the data from the thermal image may be combined. The combination of the data may be used to determine whether a temperature anomaly has been detected and/or whether the early alert should be generated.

Figure 7:
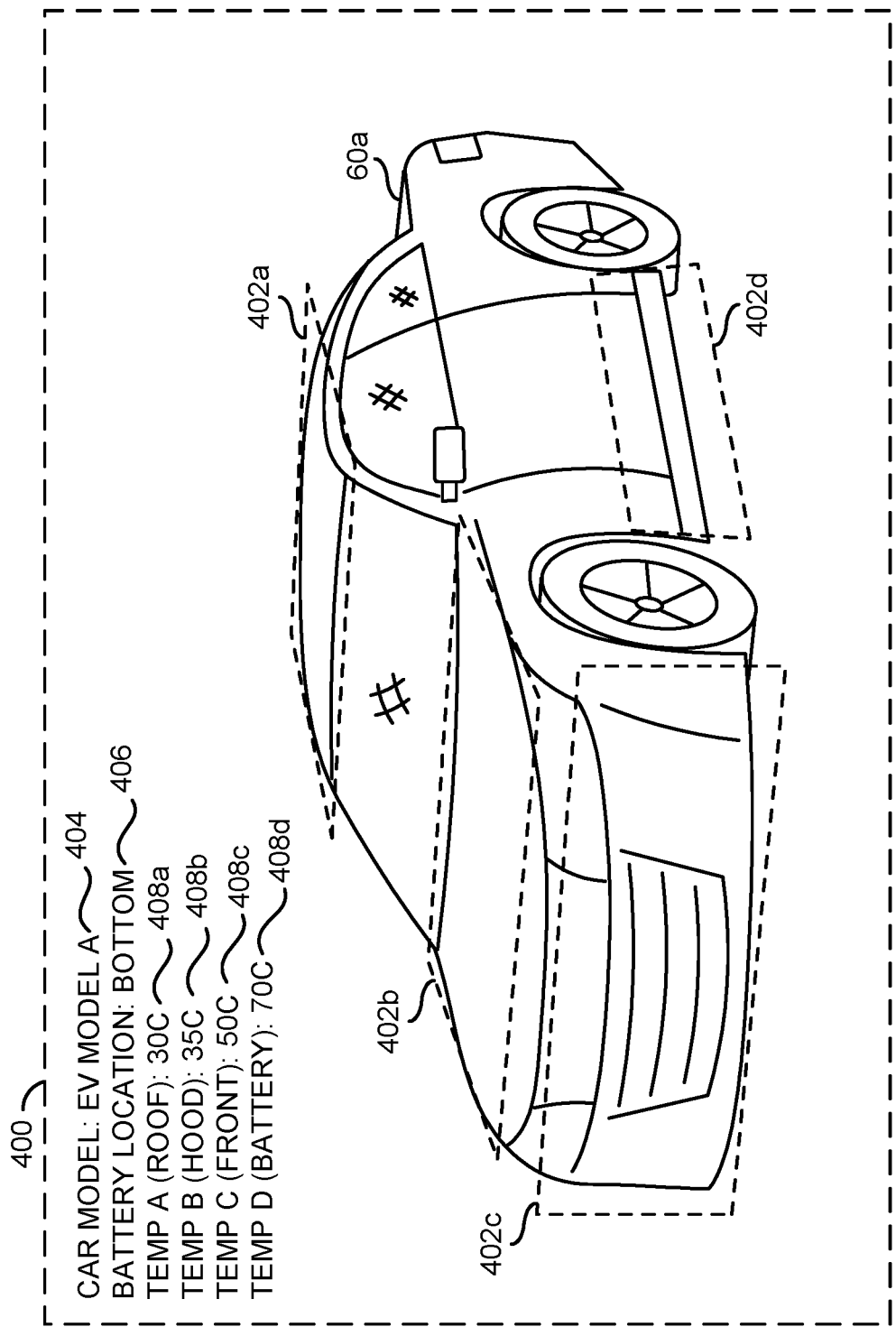
FIG. 7 is a diagram illustrating a comparison of data from a thermal image to objects detected in a visual image.

Referring to FIG. 7, a diagram illustrating a comparison of data from a thermal image to objects detected in a visual image is shown. A comparison frame 400 is shown. The comparison frame 400 may comprise the image of the vehicle 60a similar to the view shown in the thermal image 300. The comparison frame 400 may be a representative example of a combination of the results determined from the thermal image 300 and the results of the object detection performed on the video frame 350. The comparison frame 400 may comprise data analyzed by the sensor fusion module 202. The sensor fusion module 202 may generate the comparison frame 400 in order to correlate the low resolution data from the thermal image 300 to the high resolution data from the video frame 350.

The processor 156 may be configured to apply computer vision to the combination of the visible light imaging sensor 102 and the thermal imaging sensor 104. The processor 156 may be configured to combine human visible imaging and thermal imaging. The computer vision techniques may be used on either the thermal image 300, the video frame 350 and/or both using the sensor fusion module 202. The computer vision techniques may provide object awareness for the temperatures measurements in the thermal image. The object awareness may provide an additional source of information for the sensor fusion module 202 to use along with the thermal image for detecting the temperature anomalies. Using multiple sources of information may prevent false alarms that may occur if relying on one source of information alone (e.g., temperature measurements alone).

Dotted boxes 402a-402d are shown on the vehicle 60a. The dotted boxes 402a-402d may represent various features of the detected object 360a (e.g., the vehicle 60a). The features 402a-402d may be detected by the CNN module 190b. One or more of the features 402a-402d may generally correspond to the locations of the temperature measurement regions 302-306b from the thermal image 300. The number, location and/or type of features 402a-402d detected by the CNN module 190b may be varied according to the design criteria of a particular implementation.

In the example shown, the feature 402a may be the roof of the vehicle 60a, the feature 402b may be the hood of the vehicle 60a, the feature 402c may be the front end of the vehicle 60a and the feature 402d may be the battery of the vehicle 60a. The sensor fusion module 202 may be configured to analyze the features 402a-402d in response to the object classifications 210, the operating temperatures 212 and/or the anomaly locations 214. In one example, the sensor fusion module 202 may be configured to use said objects detected to detect said features 402a-402d to determine and/or detect potentially flammable components of an object (e.g., detect thermal runaway in a battery feature of an electric vehicle).

The processor 156 may be configured to compare the measured temperature regions 302a-306b to the detected objects 360a-360d. The region of interest 112a-112b of the thermal sensor 104 may be slightly different than the region of interest (e.g., the field of view) 110a-110b of the capture device 102. The processor 156 may be configured to perform disparity operations based on the relative locations and/or viewing angles of the capture device 102 and the thermal sensor 104. In an example, the processor 156 may be configured to perform the disparity operations based on the distance between the capture device 102 and the thermal sensor 104. The disparity operations may enable the processor 156 to accurately align the thermal image 300 with the video frame 350. Accurately aligning the thermal image 300 with the video frame 350 may ensure that the temperature measurement regions 302-306b from the thermal image 300 correspond to the same location in the video frame 350. With an accurate alignment of the thermal image 300 and the video frame 350, the sensor fusion module 202 may be configured to determine the temperature measurement for each of the features 402a-402d.

Metadata 404, metadata 406 and/or metadata 408a-408d is shown on the comparison frame 400. The metadata 404 may be the object classification 210 of the object 60a. In the example shown, the object classification 210 for the comparison frame 400 may be the electric vehicle model A. The metadata 406 may be the anomaly location 214. In the example shown, the anomaly location 214 for the electric vehicle model A may be the bottom of the vehicle 60a. The metadata 408a-408d may be the values of the temperature measurements determined from the thermal image 300. In the example shown, the temperature measurement 408a for the roof feature 402a may be approximately 30 C, the temperature measurement 408b for the hood feature 402b may be approximately 35 C, the temperature measurement 408c for the front end feature 402c may be approximately 50 C and the temperature measurement 408d for the roof feature 402d may be approximately 70 C.

In some embodiments, the processor 156 may perform a broad temperature analysis. For example, the broad temperature analysis may determine whether any temperature measurement for a particular object is greater than the normal temperature range. In the example shown, the temperature measurement 408d may be 70 C and the normal operating temperature range for the electric vehicle model A may be −20 C to 60 C. Since a temperature has been measured that is greater than the normal temperature range 212, the processor 156 may generate the signal ANOM (e.g., to communicate an early warning). With the broad temperature analysis, any of the temperature measurements 408a-408d greater than the normal temperature range (or increasing faster than the normal temperature change rate) may be detected as a temperature anomaly and the processor 156 may generate the signal ANOM.

In some embodiments, the processor 156 may perform a fine-grained temperature analysis. For example, the fine-grained temperature analysis may determine whether the temperature measurement for the particular feature in the anomaly location data 214 is greater than the normal temperature range. In the example shown, only the temperature measurement 408d may correspond to the temperature anomaly location 214 (e.g., the battery location for the electric vehicle). Since the temperature measurement 408d for the feature 402d corresponding to the battery location may be 70 C and greater than the normal temperature range 212, the processor 156 may generate the signal ANOM (e.g., to communicate an early warning). With the fine-grained temperature analysis, only particular temperature measurements may be relevant data. For example, if the temperature measurement 408a corresponding to the roof feature 402a of the vehicle 60a was measured to be 70 C (e.g., greater than the normal temperature range) and the battery feature 402d of the vehicle 60a was measured to be 30 C (e.g., within the normal temperature range), then the processor 156 may not generate the signal ANOM.

The low resolution thermal image 300 alone may not provide sufficient information to determine whether the measured temperature corresponds to an object that may be a potential hazard. The high resolution RGB data alone from the video frame 350 may not provide the temperature measurements to determine whether the detected objects may be a potential hazard. The combination of the data from the thermal image from the thermal sensor 104, the data from the computer vision operations performed on the video frames VFRAMES generated from the capture device 102 and/or the data about the normal temperature ranges for particular classes of objects may be analyzed by the sensor fusion module 202 to determine whether a temperature anomaly has been detected. The processor 156 may generate the signal ANOM to enable an early warning communication in response to detecting the temperature anomaly.

The analysis of the combination of thermal imaging and visual imaging may be used to detect hazardous situations. The early warning may be generated in response to the decision module 204 determining that a scenario may be potentially hazardous in response to the inferences made by the sensor fusion module 202. In one example, the hazardous situation may be a detection of thermal runaway of a battery (e.g., a Li-ion battery pack). In another example, the hazardous situation may be a detection of a consistent high temperature inside of a vehicle (e.g., potential harm to a person or pet locked inside of a vehicle). The type of potentially hazardous situation detected in response to determining the temperature anomaly may be varied according to the design criteria of a particular implementation.

Figure 8:
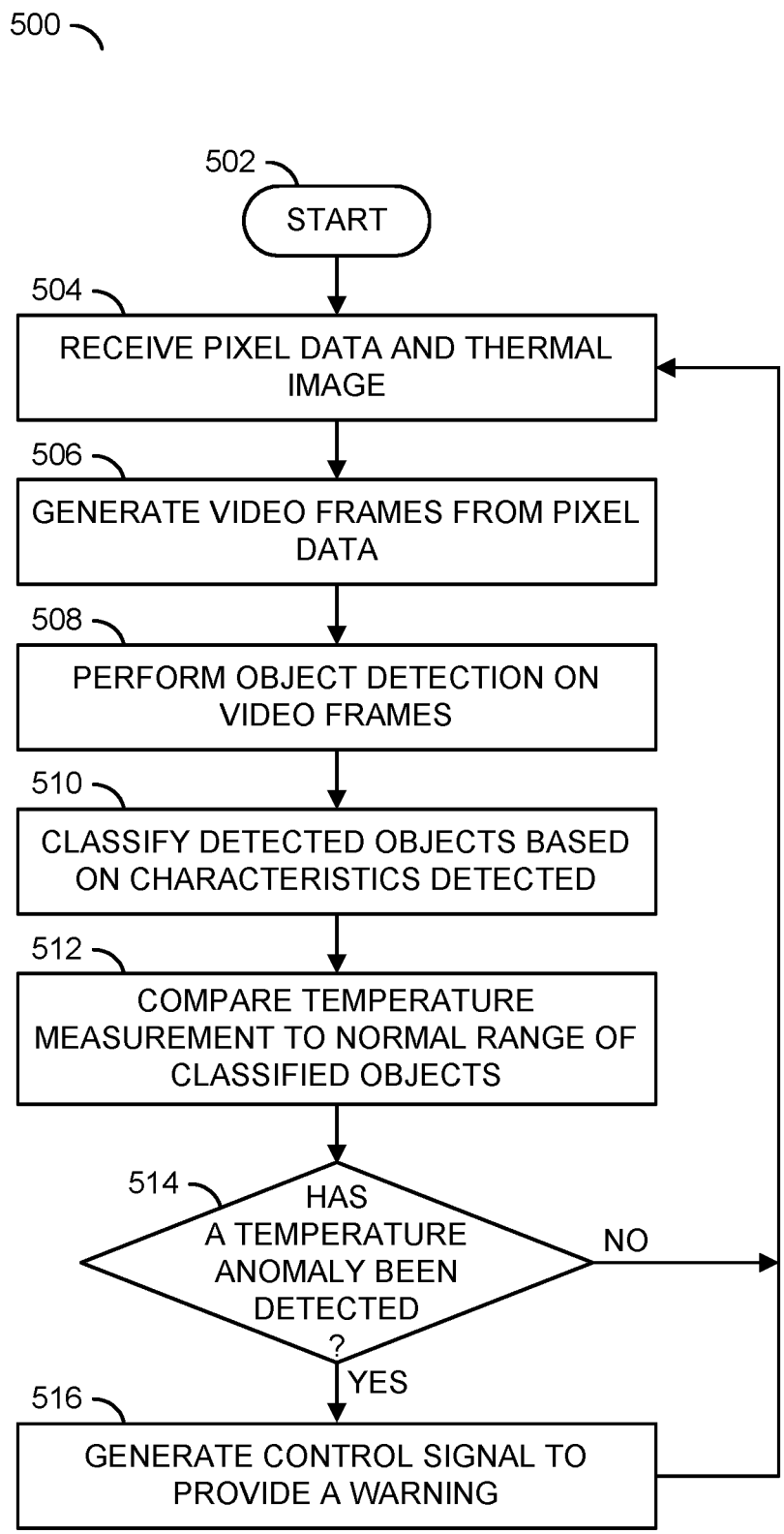
FIG. 8 is a flow diagram illustrating a method for combining visual and thermal sensing for object-aware temperature anomalies monitoring and early warning.

Referring to FIG. 8, a method (or process) 500 is shown. The method 500 may combine visual and thermal sensing for object-aware temperature anomalies monitoring and early warning. The method 500 generally comprises a step (or state) 502, a step (or state) 504, a step (or state) 506, a step (or state) 508, a step (or state) 510, a step (or state) 512, a decision step (or state) 514, and a step (or state) 516.

The step 502 may start the method 500. In the step 504, the processor 156 may receive the pixel data and the thermal image. One or more of the capture devices 102a-102n may present the signals PIXELD_A-PIXELD_N to the processor 156. The thermal sensor 104 may present the signal THIMG to the processor 156. Next, in the step 506, the processor 156 may generate video frames from the pixel data. For example, one or more of the dedicated hardware modules 190a-190n implementing the video processing pipeline 200 may generate video frames from the signals PIXELD_A-PIXELD_N. Next, the method 500 may move to the step 508.

In the step 508, the processor 156 may perform object detection on the video frames VFRAMES. In an example, the video processing pipeline 200 may present the video frames VFRAMES to the CNN module 190b as the video frames are generated to enable real-time object detection. The object detection, along with classification and/or segmentation may be part of the computer vision operations performed by the processor 156. Next, in the step 510, the processor 156 may classify the detected objects based on the characteristics detected. The classification may be performed based on the data stored in the object classifications 210. In the step 512, the processor 156 may compare the temperature measurement(s) from the thermal image data (e.g., from the signal THIMG) to the normal range of temperatures (e.g., the operating temperatures 212) corresponding to the particular classification for the objects detected. Next, the method 500 may move to the decision step 514.

In the decision step 514, the processor 156 may determine whether a temperature anomaly has been detected. The temperature anomaly may be determined based on the measured temperature detected for the particular class of object. In some embodiments, the temperature anomaly may be determined based on the particular location of the measured temperature on the object (e.g., using the anomaly location data 214). If a temperature anomaly has not been detected, then the method 500 may return to the step 504. If a temperature anomaly has been detected, then the method 500 may move to the step 516. In the step 516, the processor 156 may generate the control signal ANOM. The control signal ANOM may be used by the communication device 154 to generate the signal ALERT. The signal ALERT may provide an early warning. In an example, the early warning may provide a notification of a potential fire. Next, the method 500 may return to the step 504.

Figure 9:
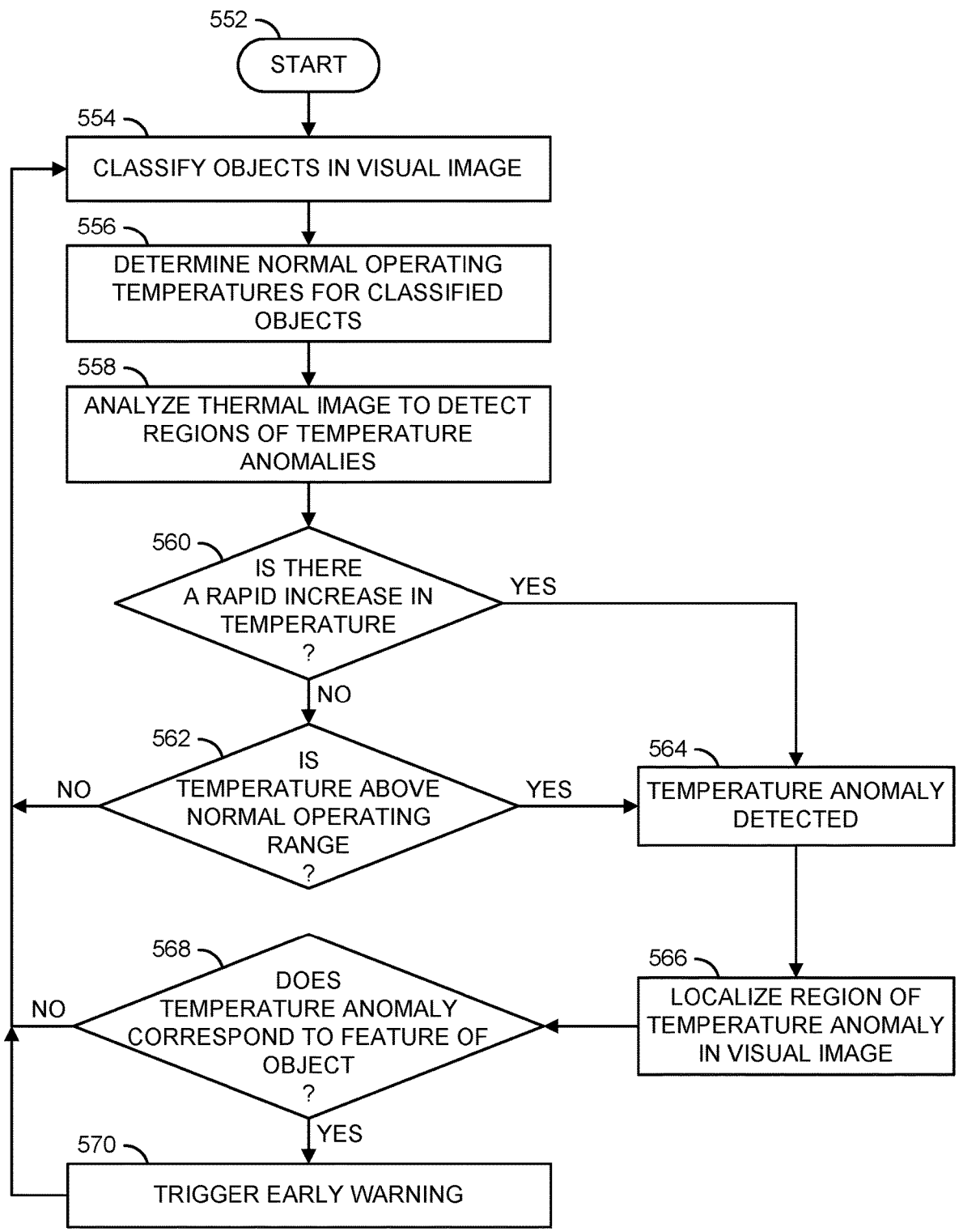
FIG. 9 is a flow diagram illustrating a method for detecting a temperature anomaly.

Referring to FIG. 9, a method (or process) 550 is shown. The method 550 may detect a temperature anomaly. The method 550 generally comprises a step (or state) 552, a step (or state) 554, a step (or state) 556, a step (or state) 558, a decision step (or state) 560, a decision step (or state) 562, a step (or state) 564, a step (or state) 566, a decision step (or state) 568, and a step (or state) 570.

The step 552 may start the method 550. In the step 554, the CNN module 190b may classify the objects in the visual image (e.g., the video frames generated by the video processing pipeline 200 from the captured pixel data). Next, in the step 556, the sensor fusion module 202 determine the normal operating temperatures for the objects classified by the CNN module 190b. For example, the sensor fusion module 202 may receive the signal DATA from the memory comprising the operating temperatures data 212. In the step 558, the sensor fusion module 202 may analyze the thermal image to detect regions of temperature anomalies. Next, the method 550 may move to the decision step 560.

In the decision step 560, the sensor fusion module 202 may determine whether there is a rapid increase in temperature. In an example, the operating temperatures data 212 may comprise data about rates of change for temperatures for various types of objects. If there is a rapid increase in temperature, then the method 550 may move to the step 564. If there is not a rapid increase in temperature, then the method 550 may move to the decision step 562.

In the decision step 562, the sensor fusion module 202 may determine whether the detected temperature is above a normal operating range. In an example, the operating temperatures data 212 may comprise ranges of temperature considered to be a normal operating range for various types of objects. If the detected temperature is not above (e.g., is within) the normal operating range for the particular class of object, then the method 550 may return to the step 554. If the detected temperature is above the normal operating range for the particular class of object, then the method 550 may move to the step 564.

In the step 564, the processor 156 may determine that a temperature anomaly has been detected. Next, in the step 566, the sensor fusion module 202 may localize the region of the temperature anomaly in the visual image. In an example, the sensor fusion module 202 may be configured to combine and/or compare data from the visual image and the thermal image to determine where the temperature anomaly is located with respect to the object detected. Next, the method 550 may move to the decision step 568.

In the decision step 568, the decision module 204 may determine whether the temperature anomaly corresponds to one of the features 402a-402d of the object. In an example, the anomaly location data 214 may comprise information about areas of concern for temperature anomalies (e.g., locations of batteries for an electronic vehicle, locations of fuel tanks, locations of flammable liquids, etc.). If the detected location of the temperature anomaly does not correspond with one of the features 402a-402d that corresponds to the anomaly location 214 of the object, then the method 550 may return to the step 554. For example, if the high temperature detected corresponds to the roof of a vehicle, the high temperature may be the result of sunlight on the roof and may not be a cause for concern (e.g., providing an early warning for a temperature anomaly caused by sunlight on the roof may be a false positive). If the detected location of the temperature anomaly does correspond with a feature of the object, then the method 550 may move to the step 570. In the step 570, the processor 156 may generate the signal ANOM to trigger the early warning. Next, the method 550 may return to the step 554.

Figure 10:
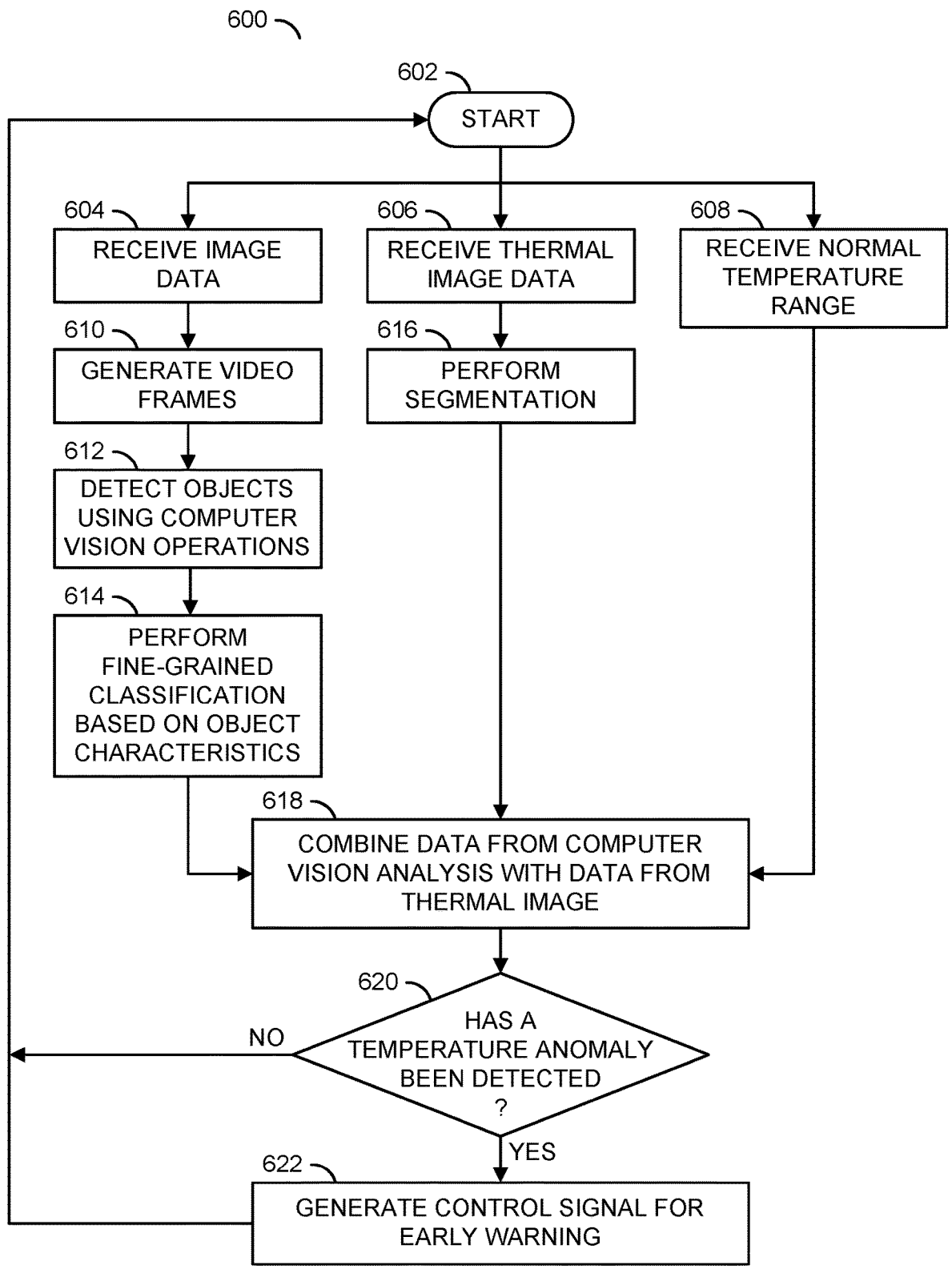
FIG. 10 is a flow diagram illustrating a method for combining thermal data, image data and temperature data.

Referring to FIG. 10, a method (or process) 600 is shown. The method 600 may combine thermal data, image data and temperature data. The method 600 generally comprises a step (or state) 602, a step (or state) 604, a step (or state) 606, a step (or state) 608, a step (or state) 610, a step (or state) 612, a step (or state) 614, a step (or state) 616, a step (or state) 618, a decision step (or state) 620, and a step (or state) 622.

The step 602 may start the method 600. Next, the method 600 may move to the step 604, the step 606 and/or the step 608. The step 604 may be one step of a sub-process (comprising the step 604 and the steps 610-614) for processing (e.g., performing computer vision operations on) the video frames. The step 606 may be one step of a sub-process (comprising the step 606 and the step 616) for processing the thermal image data. The step 608 may be one step for a sub-process for determining characteristics about the detected objects. The sub-processes may be performed substantially and/or partially in parallel. The sub-processes may each be a component of a pipeline where some steps of one sub-process rely on information determined by another one of the sub-processes in the pipeline.

In the step 604, the video processing pipeline 200 may receive the image data (e.g., one or more of the pixel data PIXELD_A-PIXELD_N). Next, in the step 610, the video processing pipeline 200 may generate the video frames VFRAMES. Next, in the step 612, the CNN module 190*b* may detect objects in the video frames using the computer vision operations. In one example, the classification performed in the step 612 may determine a general category of the objects detected (e.g., a car, a person, a street sign, etc.). Next, in the step 614, the CNN module 190*b* may perform a fine-grained classification of the object based on the object characteristics. In some embodiments, the step 614 may be an optional step. In an example, the fine-grained classification may comprise details about the make/model/year of a vehicle. In another example, the fine-grained classification may comprise details about the location that the thermal anomaly is located (e.g., where the car battery is located). In yet another example, the fine-grained classification may identify a particular vehicle (e.g., based on the license plate, by identifying the person entering/exiting the vehicle, based on specific decals or scratches, etc.). Next, the method 600 may move to the step 618.

In the step 606, the sensor fusion module 202 may receive the thermal image data (e.g., the signal THIMG). Next, in the step 616, the sensor fusion module 202 may perform segmentation. The segmentation may be configured to determine where in the thermal image data that a high temperature reading is located. Next, the method 600 may move to the step 618.

In the step 608, the sensor fusion module 202 may receive the normal temperature range for the object detected. In some embodiments, the step 608 may be performed after, or in parallel to the steps 612 and/or 614 to enable the operating temperatures data 212 to retrieve the normal operating temperatures for the particular class and/or particular feature of the object detected by the CNN module 190*b*. Next, the method 600 may move to the step 618.

In the step 618, the sensor fusion module 202 may combine data from the computer vision analysis with the data from the thermal image analysis. In some embodiments, the data from the segmentation may be used in the step 612 and/or the step 614 to correlate the location of the thermal anomalies with the fine-grained classification of the object characteristics. Next, the method 600 may move to the decision step 620.

In the decision step 620, the decision module 204 may determine whether a temperature anomaly has been detected. The detection of the temperature anomaly may be determined in response to determining whether the detected temperatures for particular objects are outside a normal operating temperature range for the class of object detected. If no temperature anomaly has been detected, then the method 600 may return to the step 602. If a temperature anomaly has been detected, then the method 600 may move to the step 622. In the step 622, the decision module 204 may generate the control signal ANOM for the early warning. Next, the method 600 may return to the step 602.

Figure 11:
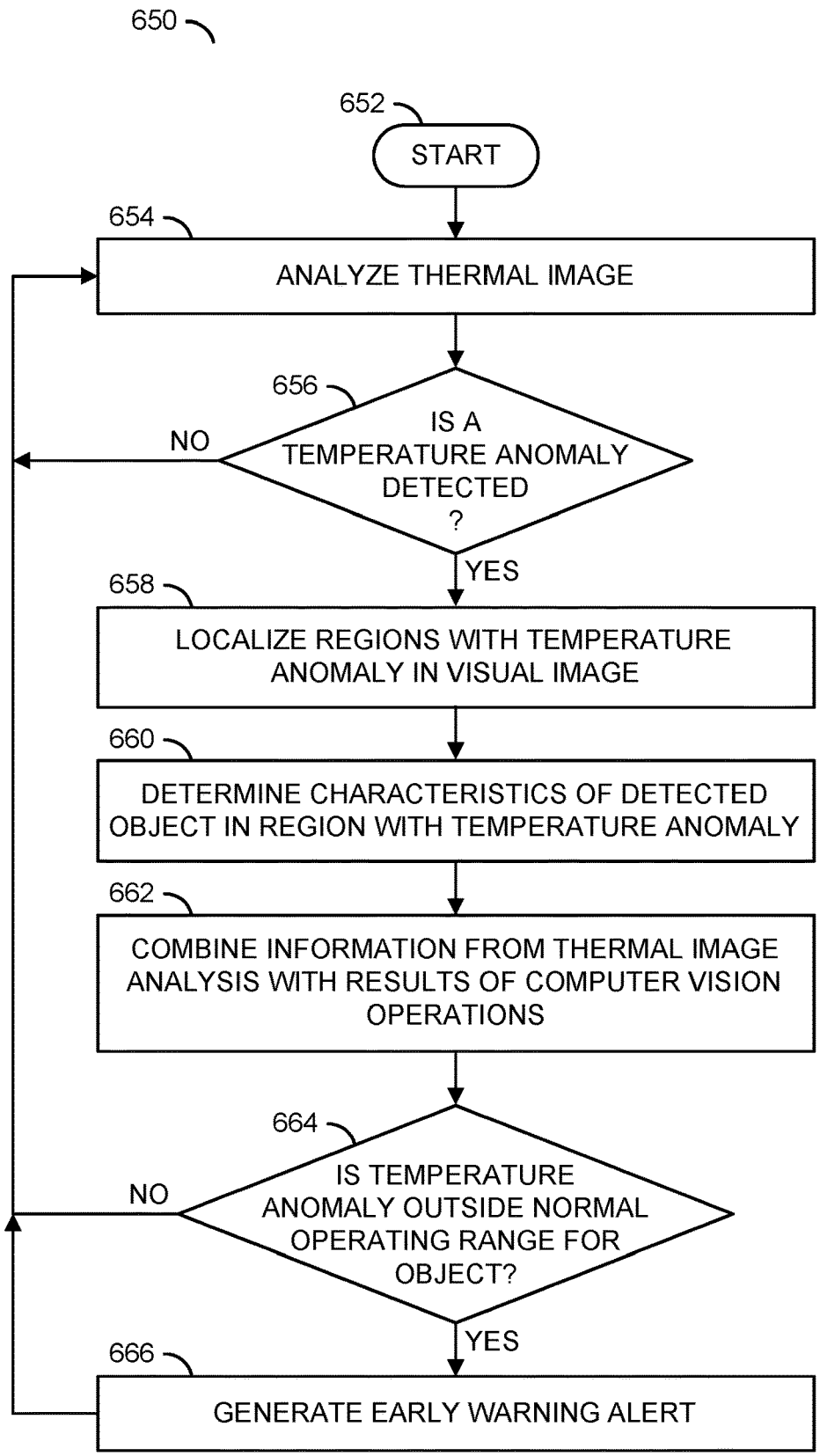
FIG. 11 is a flow diagram illustrating a method for localizing regions with a temperature anomaly.

Referring to FIG. 11, a method (or process) 650 is shown. The method 650 may localize regions with a temperature anomaly. The method 650 generally comprises a step (or state) 652, a step (or state) 654, a decision step (or state) 656, a step (or state) 658, a step (or state) 660, a step (or state) 662, a decision step (or state) 664, and a step (or state) 666.

The step 652 may start the method 650. In the step 654, the processor 156 may analyze the thermal image 300 generated by the thermal sensor 104. Next, the method 650 may move to the decision step 656.

In the decision step 656, the processor 156 may determine whether a temperature anomaly has been detected. In an example, the temperature anomaly may be determined without first determining the class of the objects. For example, the temperature anomaly may be determined by general parameters (e.g., an increase of ten degrees Celsius within thirty seconds, a temperature above sixty degrees Celsius, etc.). If no temperature anomaly has been detected, then the method 650 may return to the step 654. If a temperature anomaly has been detected, then the method 650 may move to the step 658.

In the step 658, the processor 156 may localize the regions of the thermal image 300 that have the temperature anomaly in the visual image (e.g., the video frame 350). For example, the comparison image 400 may be generated to compare the locations of the temperature anomalies to the visual data. Next, in the step 660, the processor 160 may determine the characteristics of the detected object in the region with the temperature anomaly. For example, the CNN module 190*b* may analyze the region of the video frame that corresponds to the location of the temperature anomaly (e.g., the detected features 402*a*-402*n*). In the step 662, the sensor fusion module 202 may combine the information extracted by the processor 156 from the thermal image 300, with the results extracted by the processor 156 from the computer vision operations. Next, the method 650 may move to the decision step 664.

In the decision step 664, the decision module 204 may determine whether the temperature anomaly is outside the normal operating temperature range for the particular class of object and/or for the particular feature of the object. For example, the processor 156 may first search the thermal image 300 for potential anomalies (e.g., in the decision step 656), and then search particular regions for specific anomalies (e.g., based on the object class and/or features of the object in the decision step 664 using computer vision). If the temperature anomaly is within the normal operating range for the object, then the method 650 may return to the step 654. If the temperature anomaly is outside of the normal operating temperature range for the object, then the method 650 may move to the step 666. In the step 666, the processor 156 may generate the signal ANOM. The signal ANOM may be used to initiate the early warning alert. Next, the method 650 may return to the step 654. For example, the monitoring may be continuous.

The functions performed by the diagrams of FIGS. 1-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    an interface configured to receive (i) pixel data generated by a capture device and (ii) a temperature measurement generated by a thermal sensor; and
    a processor configured to (i) receive said pixel data and said temperature measurement from said interface, (ii) process said pixel data arranged as video frames, (iii) perform computer vision operations on said video frames to detect objects, (iv) perform a classification that determines a make and model of a vehicle detected based on a comparison of characteristics of said objects and information from a vehicle database, (v) perform a segmentation operation to localize each of a plurality of regions of said temperature measurement from said thermal sensor to a battery location that corresponds to said make and model of said vehicle classified in said video frames, (vi) detect a temperature anomaly in response to (a) said temperature measurement localized to said battery location and (b) an operating temperature range determined for a battery particular to said make and model of said vehicle and (vii) generate a control signal in response to said temperature anomaly, wherein
    (a) said control signal provides a warning based on said temperature anomaly,
    (b) said operating temperature range specific to said battery implemented by said make and model of said vehicle is retrieved from said vehicle database in response to said classification, and
    (c) said temperature anomaly is detected when said temperature measurement localized to said battery location is outside of said operating temperature range for said battery implemented by said make and model of said vehicle.

2. The apparatus according to claim 1, wherein said thermal sensor and said capture device are each a component of said apparatus.

3. The apparatus according to claim 1, wherein said temperature measurement comprises a thermal image.

4. The apparatus according to claim 1, wherein said operating temperature range for said battery are specific to said make and model of said vehicle detected and said operating temperature range for a first type of said make and model of said vehicle in said vehicle database is different than a second type of said make and model of said vehicle in said vehicle database.

5. The apparatus according to claim 1, wherein (i) said make and model of said vehicle detected comprises an electric vehicle, (ii) said temperature anomaly corresponds to said battery of said electric vehicle, (iii) said thermal sensor is located remotely from said battery, and (iv) said temperature measurement is compared to said operating temperature range for said battery stored in said vehicle database.

6. The apparatus according to claim 1, wherein (i) said temperature anomaly indicates a potential fire hazard before a fire occurs and (ii) said warning provides a notification of said potential fire hazard.

7. The apparatus according to claim 1, wherein (i) said temperature anomaly is a rapid increase in temperature, (ii) a lookup table in said vehicle database comprises a rate of temperature increase considered anomalous for said make and model of said vehicle, and (iii) said rapid increase in temperature is used to detect thermal runaway of a battery.

8. The apparatus according to claim 1, wherein (i) said classification provides vehicle specific awareness for said temperature measurement and (ii) said vehicle specific awareness provides an additional source of data to prevent false alarms from detecting said temperature anomaly based on said temperature measurement alone.

9. The apparatus according to claim 1, wherein said processor performs said computer vision operations by applying a convolution operation using matrix multiplication of a plurality of layers defined by a feature detection window implemented on each of said video frames.

10. The apparatus according to claim 1, wherein (i) said processor is configured to detect said temperature anomaly in response to inferences made by performing sensor fusion operations on data from disparate sources and (ii) a confidence level of said inferences determined using said sensor fusion operations on said data from said disparate sources indicates more reliability of said inferences than using one of said disparate sources alone.

11. The apparatus according to claim 1, wherein said processor is further configured to correct a disparity between said video frames and said temperature measurement based on a difference of mounting location between said capture device and said thermal sensor.

12. The apparatus according to claim 1, wherein said apparatus is configured to implement object-aware temperature anomalies monitoring and early warning by combining visual and thermal sensing.

13. The apparatus according to claim 1, wherein said apparatus (i) is mounted to a charging station for an electric vehicle and (ii) monitor for said configured to temperature anomaly in said electric vehicle connected to said charging station.

14. The apparatus according to claim 1, wherein (i) said classification of said objects further comprises detecting a person, (ii) said control signal is further generated in response to detecting a behavior of said person and (iii) said apparatus is configured to provide surveillance of a parking lot.

15. A method for providing an early warning of a temperature anomaly comprising the steps of:
(A) receiving pixel data from a capture device;
(B) receiving a thermal image from a thermal sensor;
(C) processing said pixel data arranged as video frames using a processor;
(D) performing computer vision operations using said processor on said video frames to detect objects;
(E) performing a classification that determines a make and model of a vehicle detected using said processor based on a comparison of characteristics of said objects and information from a vehicle database;
(F) performing a segmentation operation to localize each of a plurality of regions of said thermal image to a battery location that corresponds to said make and model of said vehicle classified in the video frames,
(G) detecting said temperature anomaly in response to (a) said thermal image localized to said battery location and (b) an operating temperature range determined for a battery particular to said make and model of said vehicle; and
(H) generating a control signal in response to said temperature anomaly, wherein
(a) said control signal provides a warning based on said temperature anomaly,
(b) said operating temperature range specific to said battery implemented by said make and model of said vehicle is retrieved from said vehicle database in response to said classification, and,
(c) said temperature anomaly is detected when said thermal image localized to said battery location is outside of said operating temperature range for said battery implemented by said make and model of said vehicle.

16. The apparatus according to claim 1, wherein said thermal sensor is configured to provide said temperature measurement for a plurality of said objects located in a field of view of said capture device mounted in a vehicle parking lot.

17. The apparatus according to claim 1, wherein said warning provided by said control signal is provided to at least one of a particular person, a monitoring service and an emergency response service.

18. The apparatus according to claim 1, wherein
(a) said temperature measurement comprises a low resolution of data for said plurality of regions that is insufficient for performing said computer vision operations to determine said characteristics of said objects, and
(b) said video frames comprise a high resolution of data that is sufficient to enable said segmentation operation to combine said regions of said temperature measurement from said thermal sensor with said battery location of said make and model of said vehicle in said video frames.

19. The apparatus according to claim 18, wherein (i) said high resolution of data of said video frames alone does not provide temperature information, (ii) said low resolution of data of said temperature measurement alone does not enable detection of a potential hazard, (iii) combining said regions of said temperature measurement from said thermal sensor with said battery location of said make and model of said vehicle in said video frames provides a spatial overlay of said vehicle with said temperature measurement to enable a comparison of said operating temperature range specific to said make and model of said vehicle and (iv) said operating temperature range specific to said make and model of said vehicle is stored in said vehicle database that is located remotely from said apparatus.

20. An apparatus comprising:
  an interface configured to receive (i) pixel data and (ii) a thermal image; and
  a processor configured to (i) receive said pixel data and said thermal image from said interface, (ii) process said pixel data arranged as video frames, (iii) perform computer vision operations on said video frames to detect vehicles, (iv) perform a classification that determines a make and model of each of said vehicles detected based on a comparison of characteristics of said vehicles and information from a vehicle database, (v) determine a battery location specific to said make and model of each of said vehicles in response to said information from said vehicle database, (vi) perform a segmentation operation to localize a heat map from said thermal image to said battery location for each of said vehicles in said video frame, (vi) detect a temperature anomaly in response to (a) said heat map localized to said battery location and (b) an operating temperature range determined for a battery particular to said make and model of said vehicles and (vii) generate a control signal in response to said temperature anomaly, wherein
  (a) said control signal provides a warning based on said temperature anomaly,
  (b) said operating temperature range specific to said battery implemented by said make and model of said vehicles is retrieved from said vehicle database in response to said classification, and
  (c) said temperature anomaly is not detected unless said heat map that is outside said operating temperature range is localized to said battery location of said make and model of said vehicles.

* * * * *